(12) United States Patent
Beauregard et al.

(10) Patent No.: US 6,687,284 B1
(45) Date of Patent: Feb. 3, 2004

(54) METHOD AND APPARATUS TO FACILITATE RESTRIKING IN AN ARC-FURNACE

(75) Inventors: François Beauregard, Bouchervillle (CA); Bruno Francoeur, Beloeil (CA)

(73) Assignee: Centre d'Innovation sur le Transport d'Energie du Québec, Varennes (CA)

( * ) Notice: Subject to any disclaimer, the term of this patent is extended or adjusted under 35 U.S.C. 154(b) by 0 days.

(21) Appl. No.: 10/129,104

(22) PCT Filed: Nov. 16, 2000

(86) PCT No.: PCT/CA00/01367

§ 371 (c)(1),
(2), (4) Date: Sep. 9, 2002

(87) PCT Pub. No.: WO01/37619

PCT Pub. Date: May 25, 2001

Related U.S. Application Data

(60) Provisional application No. 60/166,406, filed on Nov. 19, 1999.

(30) Foreign Application Priority Data

Nov. 16, 1999 (CA) ............................. PCT/CA99/01091

(51) Int. Cl.$^7$ ............................................... H05B 7/144

(52) U.S. Cl. .................... 373/102; 373/104; 219/121.11

(58) Field of Search ............................ 373/2, 45, 102, 373/104, 108; 315/174, 283, 615, 623; 30/90.6, 90.8; 29/825; 164/470, 509; 65/19; 219/121.37, 121.11

(56) References Cited

U.S. PATENT DOCUMENTS

| 3,915,217 A | * | 10/1975 | Ellebrecht et al. | .......... 164/470 |
| 5,583,883 A | * | 12/1996 | Paulsson et al. | ............ 373/102 |
| 5,723,951 A | * | 3/1998 | Byszewski et al. | ......... 315/174 |

FOREIGN PATENT DOCUMENTS

| BE | 896449 A | * | 10/1983 | ............ H05B/7/14 |
| FR | 2648001 A | * | 12/1990 | ............ H05H/1/24 |

* cited by examiner

*Primary Examiner*—Tu Ba Hoang
(74) *Attorney, Agent, or Firm*—C. Marc Benoît; Ogilvy, Renault

(57) ABSTRACT

To re-ignite efficiently an arc-furnace arc extending between an electrode and a material to be melt, a second energy supply is provided to maintain a plasma link between the electrode and the melting material when the arc-furnace arc is interrupted The electrode is supplied by a large current power supply including a large current conductor having a self inductance and being connected to the electrode. The second energy supply is an electrical power supply wherein a high frequency bypass impedance is provided in a supply path to the large current conductor at a distance from a capacitive circuit to allow a high frequency resonant circuit to be formed by the conductor section between the capacitive circuit and the bypass impedance without adversely affecting the large current power supply of the arc furnace. The capacitive circuit comprises an HF power supply injected in resonance with the resonant circuit to build an oscillating voltage and use the oscillating voltage to inject an HF current between the electrode and the melting metal in order to maintain the plasma link.

30 Claims, 15 Drawing Sheets

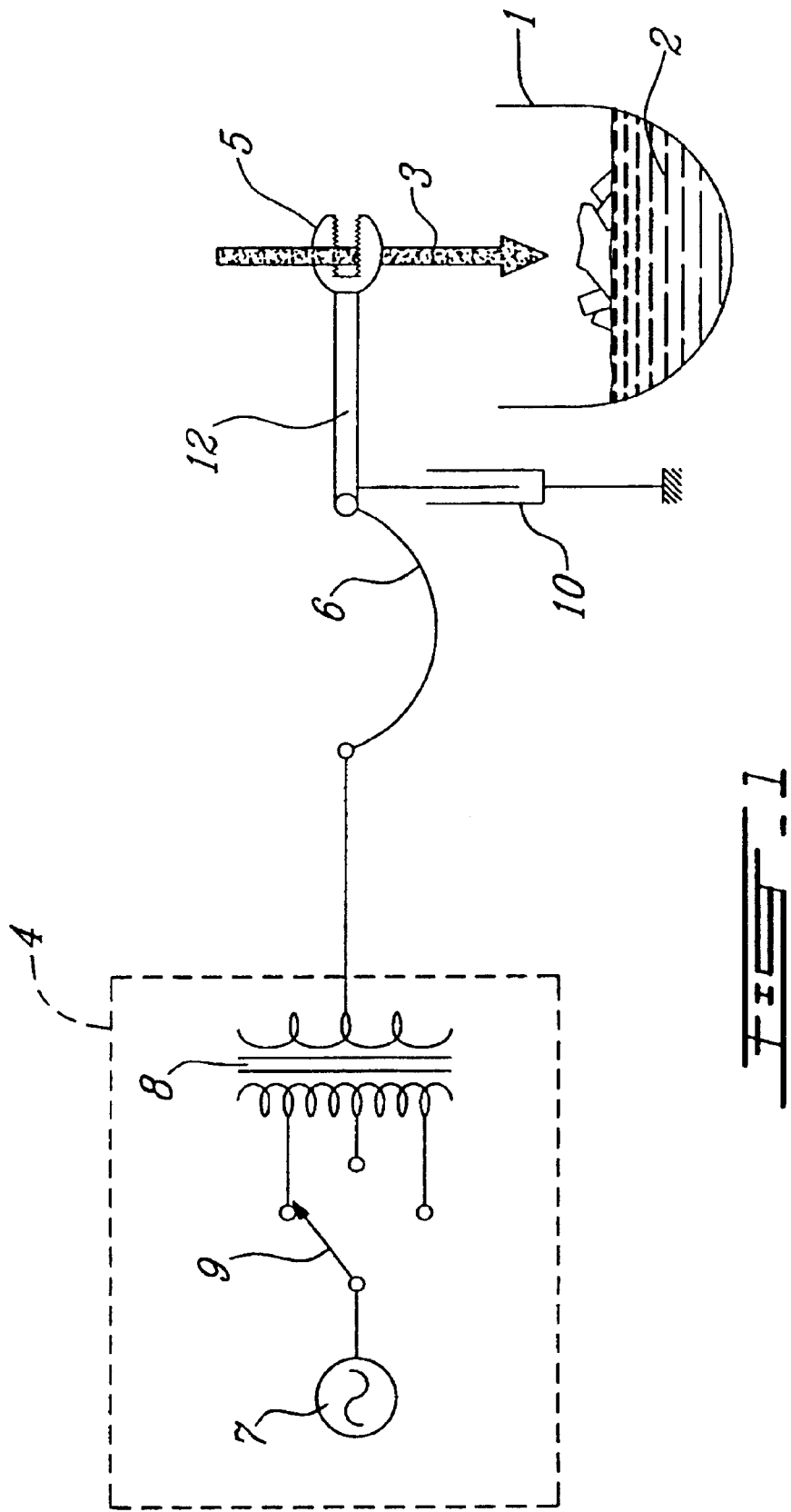

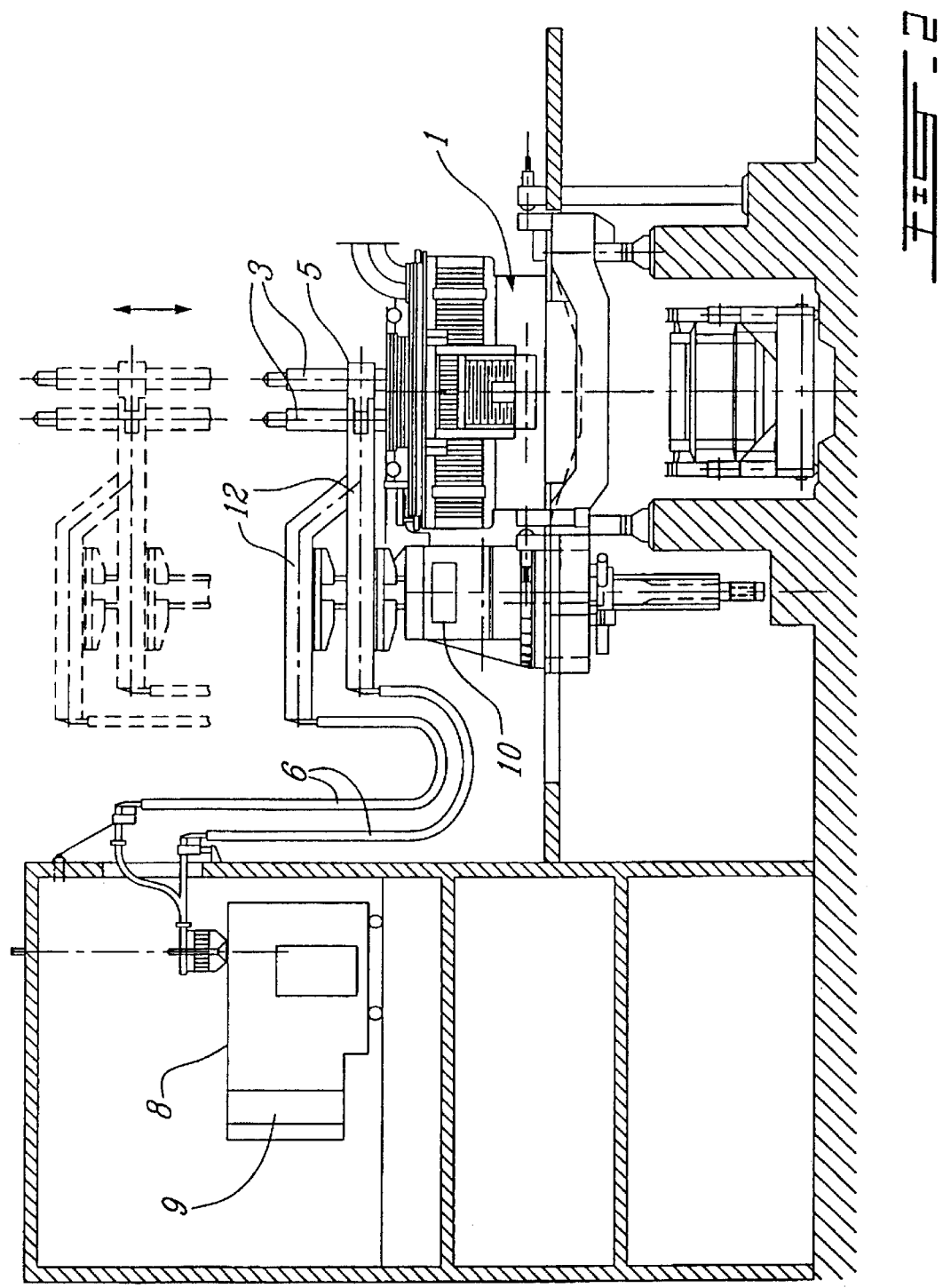

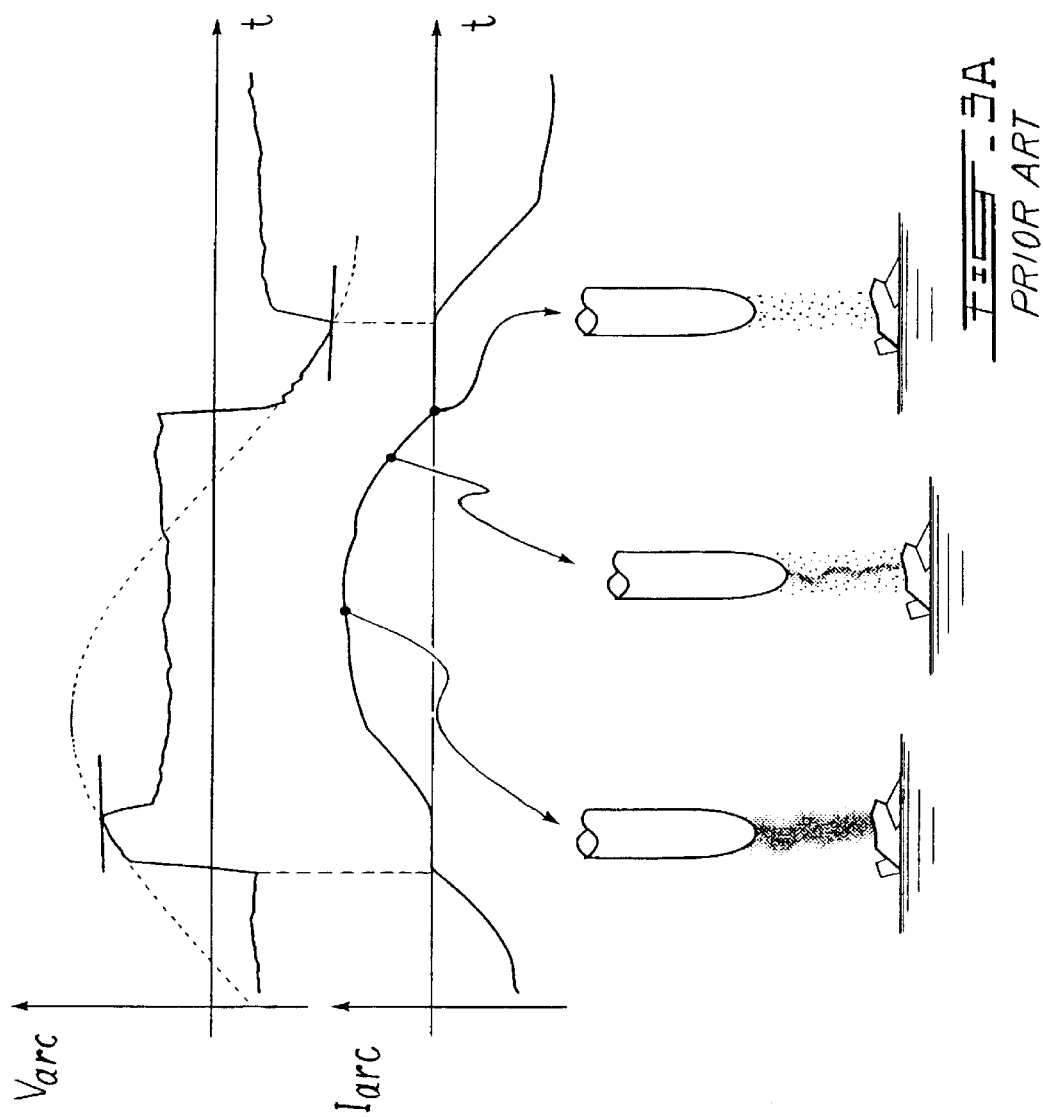

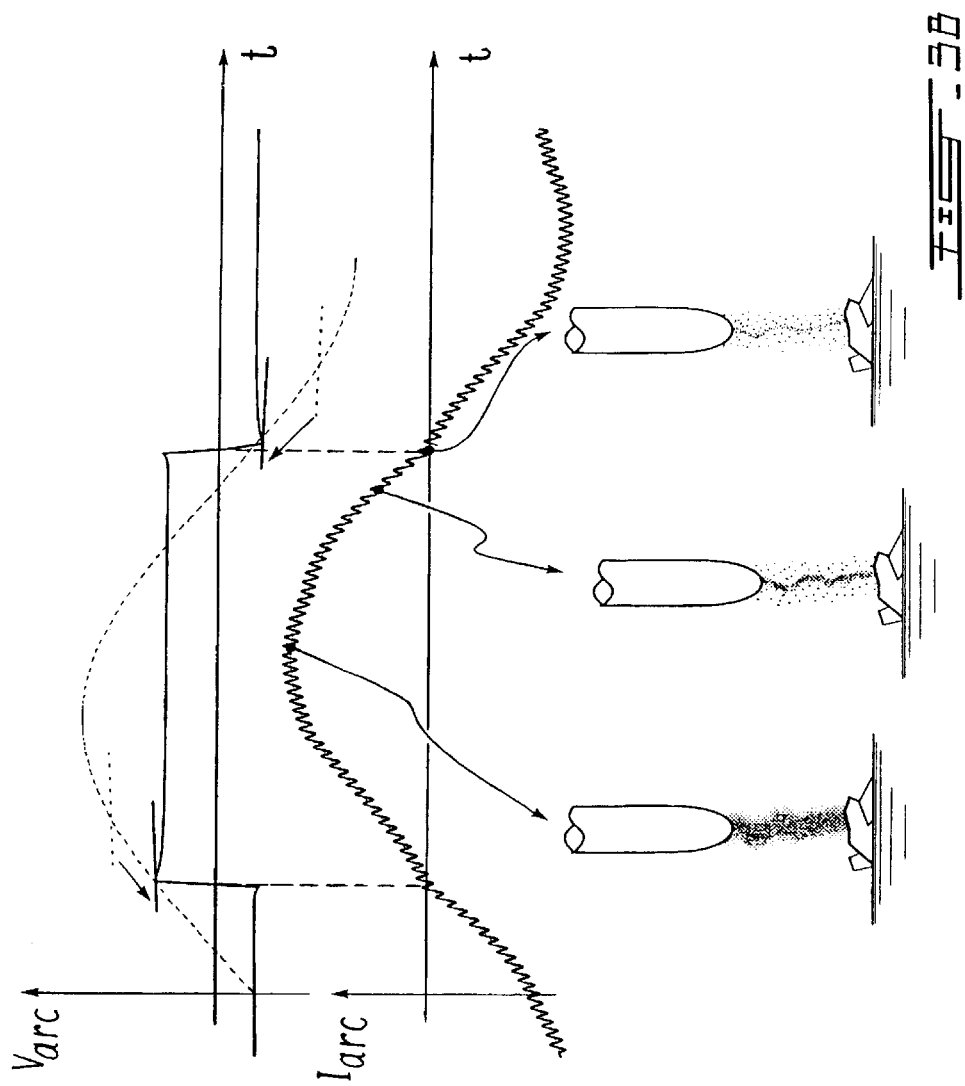

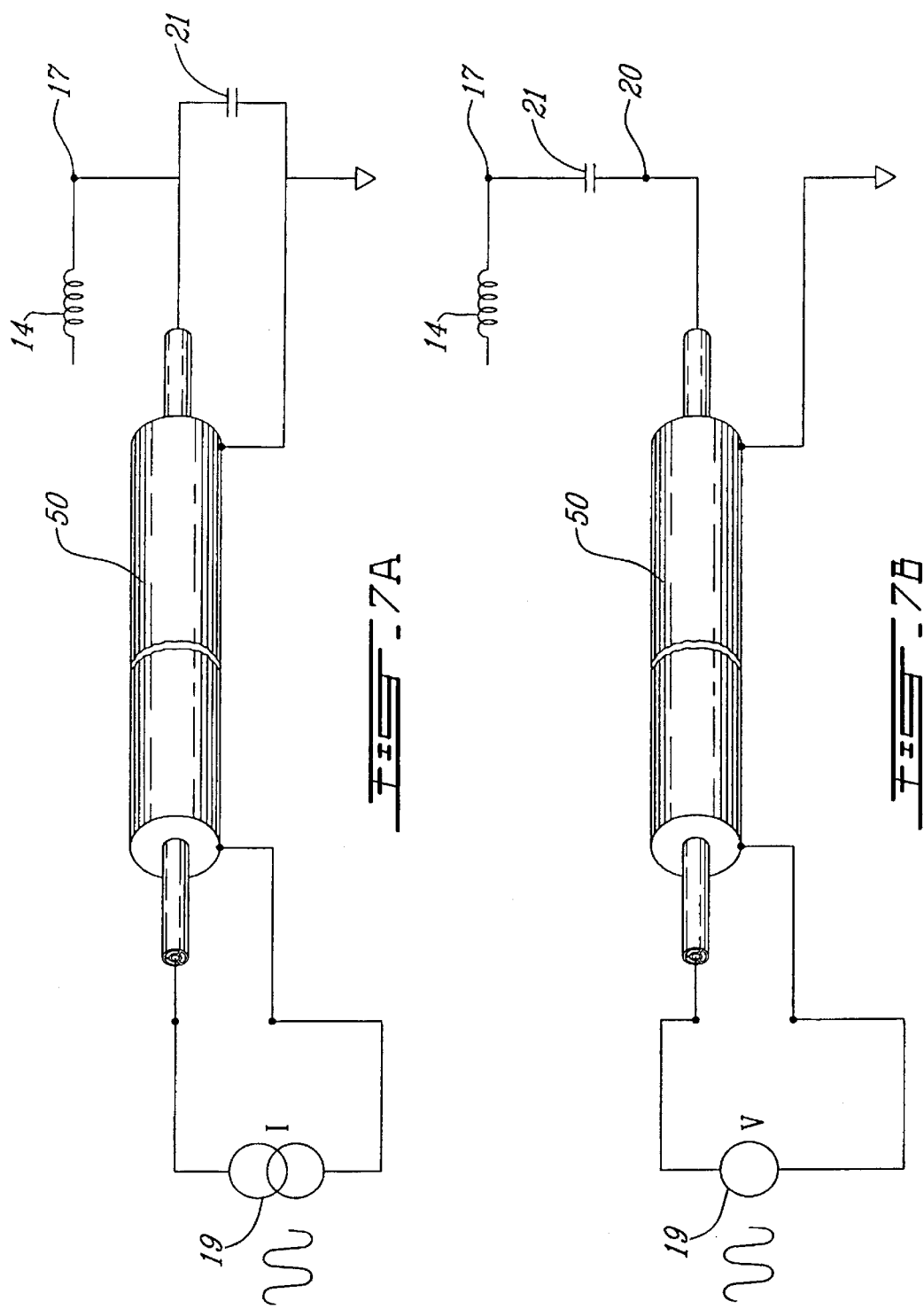

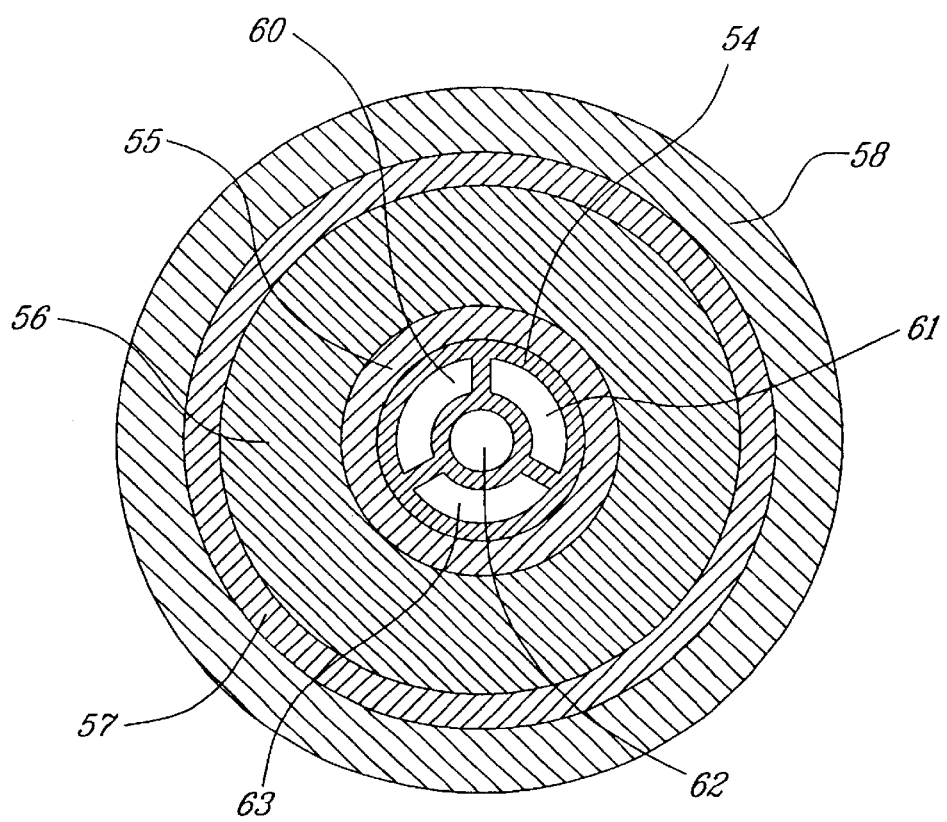

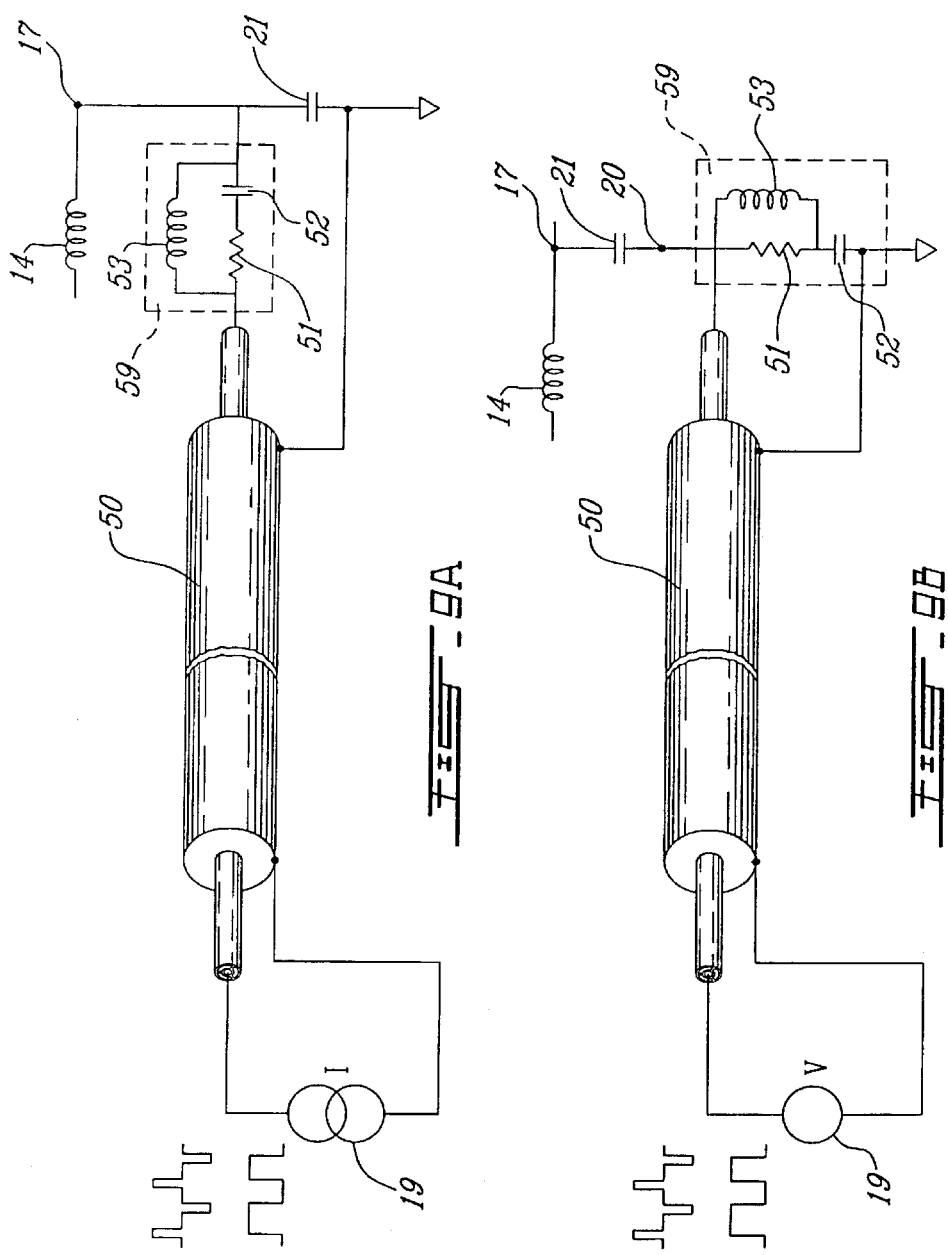

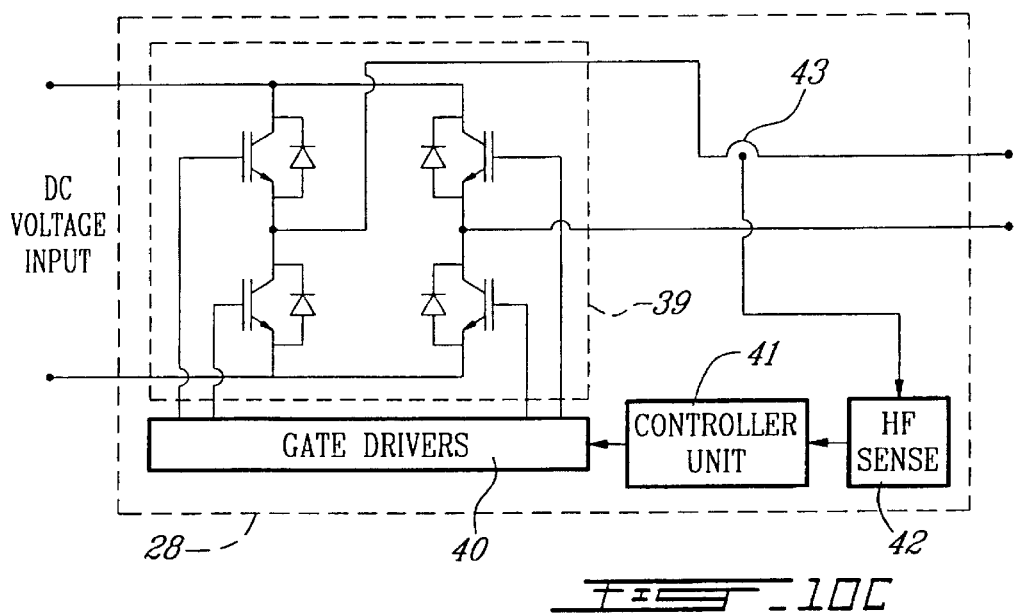
_FIG_10C
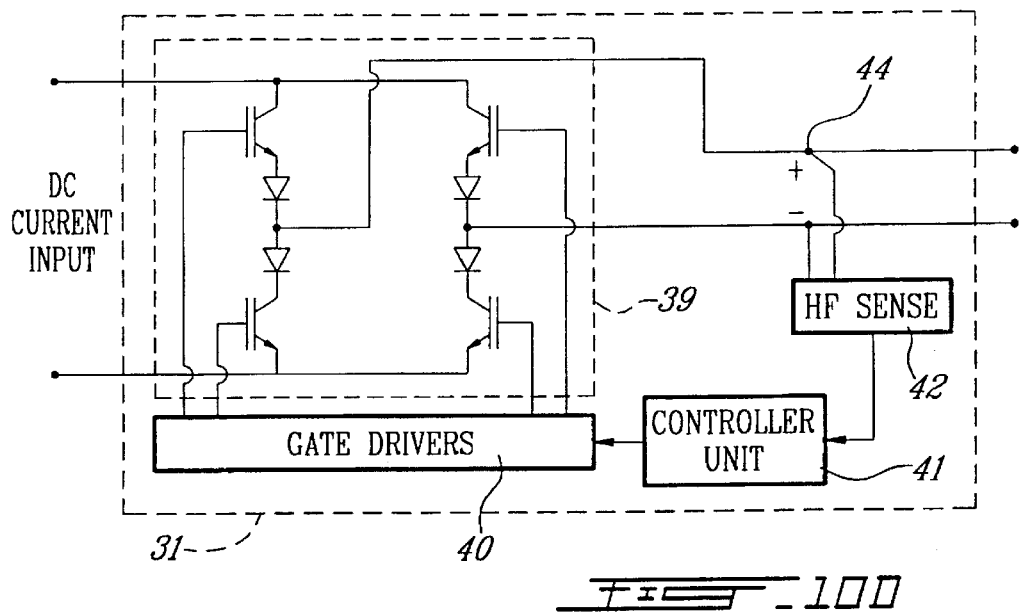
_FIG_10D

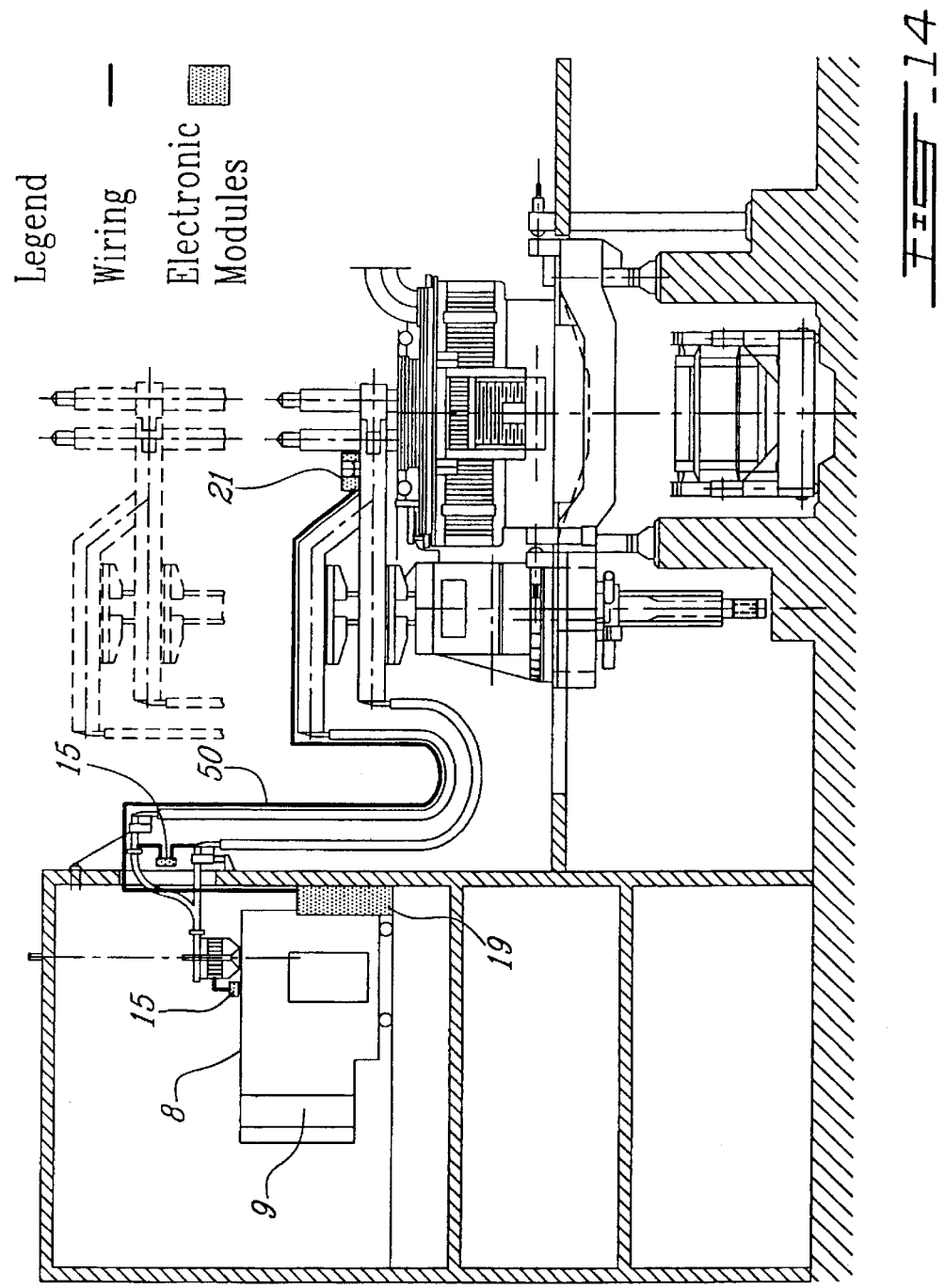

METHOD AND APPARATUS TO FACILITATE RESTRIKING IN AN ARC-FURNACE

This application claims the benefit of provisional application No. 60/166,406 file Nov. 19, 1999.

FIELD OF THE INVENTION

The present invention relates to arc-furnace equipment and more specifically to means and methods to help an electrical arc to strike thus improving productivity, reducing operating cost and reducing flicker.

BACKGROUND OF THE INVENTION

Industrial arc-furnaces are huge furnaces which are typically used to melt different metallurgical elements such as bulk iron coming from scrap. The bulk metal is melted by the intense heat radiating from a hot gas column produced between an electrode and the scrap by an electric arc. The arc-furnace is basically composed of a vat to retain the scrap and the melted metal; a set of electrodes to spark the arcs; a set of actuators to control the electrodes distance from the scrap; and a large current power supply (including a transformer equipped with a tap changer to select a voltage level) to supply the arc currents. When the melting is completed, impurities floating on the surface are skimmed or scraped from the surface and then, the liquid metal is retrieved from the vat for further processing.

Creation of an electric arc requires an ignition normally performed by making a contact between two electrodes: a cathode and an anode. The cathode then emits electrons that are accelerated towards the anode by an electric field applied between the electrodes. These electrons collide with the gas molecules within the gap to generate positively charged ions and negatively charged free electrons to form a conductive gas column between the electrodes allowing the current to flow. A gas conductive enough to allow a current to flow will be referred in this document as a plasma. As the current increases, more collisions are made and more ions and electrons are freed, thus increasing the conductivity and temperature of the plasma column. At the same time, the cathode is bombarded with more ions and heats up thus maintaining electron emission. The anode also heats up due to the impact of the incoming electrons. The emission, the bombardments and the series of collisions generate a voltage-drop that can be divided in three zones: the cathode voltage-drop; the anode voltage-drop; and the plasma column voltage-drop. An arc-furnace arc has a voltage-drop distributed, for the most part, along the plasma column. Therefore, the arc voltage-drop will mainly increase with the arc length, will diminish inversely to the plasma temperature, and will depend on the plasma gas composition.

When the furnace electric arc is interrupted, it leaves the plasma column in an initial ionized state whose lifetime is influenced by the rate of plasma temperature drop and composition. The ignition-voltage required to re-strike the electrical arc will increase with the degradation of the plasma state. If the plasma is lost, a dielectric breakdown or a temporary electrical contact will be required to recreate the plasma and restrike the arc.

The most commonly used arc-furnace is the three-phase AC current type. The furnace comprises an electrode for each phase, all disposed according to a triangular pattern in the vat. During operation, each electrode produces an arc having its other end in contact with the load of metal. All the electrodes of the AC arc-furnace are alternately anode and cathode. At each half cycle, the arc current must pass through a zero point in order to reverse. The intense heat radiating from each plasma column is proportional to the arc current and therefore will fluctuate in a synchronous manner. At the line frequency of 50 or 60 Hz and in a cold environment, there is not enough heat inertia to maintain the plasma temperature to preserve the ionized state. In this case, the plasma temperature will fluctuate according to the current flow and will affect its conductivity. This change in conductivity will then affect the voltage-drop as the current fluctuates. If we consider the state following a current peak while the arc burns in a cold environment, there will be a progressive increase of the voltage-drop at the electrodes end. This voltage-drop will rise up to the extinction-voltage value where the current reaches zero and the arc extinguishes. For the reverse arc current to ignite, the alternating voltage supply must then, in the reverse polarity, exceed the ignition-voltage, which is dependent on the plasma column ionized state (temperature) and on the anode and cathode condition. After re-ignition, as the arc current increases back, the gas column warms up again, and the voltage-drop progressively regains, in reverse polarity, a lower value equivalent to the voltage-drop of the precedent current peak. If we draw the evolution of the arc voltage, the ignition-voltage will be higher than the extinction-voltage because in between events, the plasma column has continued to cool down.

An AC arc at a frequency of 50 or 60 Hz and burning in a hot environment behaves differently. The plasma column remains hot therefore sufficiently ionized when the arc current reaches zero and extinguishes. The extinction/ignition-voltage level will be weakly affected and the evolution of the voltage-drop will show a shape between a sinusoidal and a square wave.

An AC arc-furnace works with a sinusoidal voltage power supply. In order to ignite the arc shortly after its extinction, the arc-furnace operates at a lower power factor making the voltage leading the current due to the leakage inductance in the supply path of the furnace. In many cases, a series inductance is even inserted on the primary side of the furnace transformer. Then, when the current reaches zero and the extinction occurs, there is an immediate application of the reverse polarity voltage from the supply source with the vanishing of the back emf in the inductance. If the supply voltage is higher than the ignition-voltage at this instant, the arc will strike immediately. If it is not the case, a delay will be introduced until the voltage supply catches up the ignition-voltage level. This delay introduces dead time periods in the arc current, which creates current-less time intervals. Even the amplitude of the current, as well as its RMS value is reduced in a way similar to a phase controlled dimmer. The impact on the power input of the furnace is impressive.

The behavior of the arc-furnace depends strongly on the environment in which the arc is burning. Normally, a melting process involves two phases. In the first phase, subsequent loads of scrap are poured in the vat for melting down. During that phase, the furnace operates mainly in a cold environment. The arcs are not stable as they move erratically and jump from one piece of scrap to another. Also, the continuous slipping and melting of the scrap affects the arc length and generates frequent short-circuits of the electrodes. The arc behavior continuously changes the plasma column length, which also introduces a continuous variation in the dead time period and the short circuits creates inrush currents in the furnace high current power supply. If the dead time period is prolonged, the ignition-voltage will eventually become too high for the furnace supply voltage to strike an arc and the plasma will be lost. When a complete extinction of an arc occurs, the electrode must then be moved towards the scrap to make a contact and reinitiate the arc. The touch of the contact generates a high inrush current until the electrode is moved away to have enough plasma length for the current to reduce. For the second phase of the process the arcs behave differently. The scrap is completely melted in a hot liquid bath and the arcs are burning in a hotter and more stable environment. Moreover, a foamy slag is used to improve arc stability. Contrary to the first phase, the arc length is more stable and easier to control even if the arc contains current-less time intervals.

In a DC arc-furnace, there is no change in the direction of the arc current so that only the dead time periods described above do not exist. However, in a similar way to the AC arc-furnace, the erratic movement of the arc in the first phase may stretch the arc length to a limit where the furnace voltage supply can no longer maintain the current in the plasma because the voltage-drop gets to high. When this occurs, the plasma current decreases, thus cooling the arc and reducing its conductivity thus causing the current decrease to run away until the arc is interrupted and the plasma is lost. Here too, the electrodes have to be lowered in order to make a contact with the scrap for striking a new arc with the accompanied inrush current. These arc interruptions are most likely to happen only in the first phase.

The operation of an arc-furnace causes supply current fluctuations in the utility line. The largest current fluctuations are produced in the first phase by both the AC and the DC arc-furnace. In an AC arc-furnace, the erratic movement of the arcs, the dead time periods, the inrush currents and the frequent extinction of the arcs create these current fluctuations. In the DC furnace, the inrush currents, the continuous change in the firing angle of the rectifier valves to compensate for the erratic movements of the arc as well as arc interruptions are the source of the supply current fluctuations. These fluctuations are the source of voltage fluctuations in the utility network. The utility company, to a certain extent, tolerates a part of this disturbance, known as flicker. The flicker is defined as the low frequency component of the voltage fluctuation encountered on the utility grid that cause disturbance to the eyes on such equipment as a light bulb. The amount of flicker is related to the ratio between the short circuit power of the supply network and the short circuit power of the arc-furnace. Unless this power ratio is sufficiently high, the furnace working point must be adapted during the process in order to constrain the flicker level within permissible limits. The flicker level can be reduced with the aid of static power compensators or by inserting a large inductor on the primary side of the arc-furnace transformer. Unfortunately, these apparatus are costly and the modifications to the arc-furnace supply are significant. Often, the arc-furnace operates with a low supply voltage and with the electrodes closer to the scrap. This will reduce the injected power until the scrap phase is completed and then, the power is increased as the burning arcs are more stable and the flicker is reduced.

An important aspect of an arc-furnace is its productivity. An arc-furnace is operated to produce the greatest number of heats possible. It is strongly related to the amount of power that can be transmitted to melt the scrap in a given time. The frequent complete extinction of the arcs, the dead time period encountered between each extinction and ignition, and the limited amount of flicker that can be tolerated, all contribute negatively to the arc-furnace production since these events all extend the melting process time.

Another important aspect of an arc-furnace is the production cost. For a fixed plasma current, the plasma voltage and heating capacity are proportional to the arc length. A longer arc will allow a plasma current reduction for a same amount of injected power. A smaller current has the advantage of reducing the electrode deterioration and consumption and also reduces the Joule losses in the supply circuit. Consequently, they will reduce the production cost.

These advantages will reduce the melting process time and the arc-furnace operating and maintenance cost and they will improve productivity.

A method to precipitate the striking of the electrical arc was disclosed in the international PCT application publication number WO 94/22279 (inventors Paulsson and Angquist). In this document, the apparatus improves the arc burning behavior by supplying to the electrodes a voltage pulse in connection with an interruption of the arc. After an immediate extinction of an arc, a voltage pulse is injected by discharging a capacitor or is induced in an inductor in the supply path by a temporary short-circuit to shorten the current-less intervals of the arcs. Unfortunately, for maximum efficiency, the apparatus requires the pulse to be injected at an optimum time delay following an interruption of the arc. The ignition may be unreliable because the striking of the main furnace arc may not happen or the main furnace arc current may not reach sufficient amplitude to maintain the arc after the voltage pulse has disappeared. (The main furnace arc is defined as the electric arc current supplied in the plasma column by the arc-furnace transformer). Moreover, during the delay preceding the injection of the pulse and during the time elapsing after the pulse disappears without the main furnace arc being struck, the plasma ionized state still continues to degrade. Also, the controller unit must track the arc-furnace output current to operate adequately. This method may prove to be reliable in the liquid bath phase of a heat but is difficult to apply in the first phase where the arc is erratic and most of the problems are encountered. The apparatus disclosed also requires a serial inductor at the output of the arc-furnace supply. Knowing that the supplied current is enormous, the inductor size is likely to be large. It is mentioned that the inductor could be avoided if the inductance consists of the inductance of the network, the furnace transformer and the connection lead. This option implies that part of the voltage pulse will propagate into the transformer and into the utility network, which is generally not desired nor allowed by the arc-furnace owner or the utility. If the inductor includes the furnace connection leads, then the power electronics must be located close to the electrodes where the environment conditions are extremely severe and where maintenance is problematic and must require a furnace shutdown.

SUMMARY OF THE INVENTION

An improvement of the arc-furnace can be accomplished by the application of a method to precipitate the striking of the electrical arc or avoid its interruption. This method offers the multiple following advantages:

The arc length or current can be increased;

the mean cyclic extinction period can be lowered;

the number of complete extinction event can be reduced;

the electrodes consumption can be reduced;

the Joule losses in the electrical circuit can be lowered;

the power factor can be increased;

and the flicker level can be lowered or the power can be increased.

It is an object of the present invention to provide a novel method and apparatus aimed to facilitate arc restriking in an arc-furnace, hence to obtain the advantages mentioned in the above background description without the drawbacks of the previous art.

It is a secondary object of the present invention to provide an apparatus to work in parallel with an arc-furnace without making major change to the arc-furnace structure and power supply.

It is another secondary object of the present invention to provide means to avoid excessive voltage amplitudes to be applied to the arc-furnace components.

It is another secondary object of the present invention to provide an apparatus in which the power electronics and the control unit are not exposed to the arc-furnace severe environment and can be accessed for maintenance without requiring an interruption of the furnace operation.

It is another secondary object of the present invention to provide an apparatus in which the controllability can be made simple and does not require an optimal time interval to act in order to be effective.

In accordance with a first aspect of the invention, there is provided an apparatus for improving re-striking in an arc-furnace having a large current conductor with a high-current power supply connected to one end of the conductor and an electrode connected to the other end of the conductor to produce an electrical arc for melting metal, the apparatus comprising a second quasi-continuous energy supply for maintaining a plasma link between the electrode end and the melting metal following an interruption of the electrical arc.

In accordance with another aspect of the invention, there is provided a method for melting metal in an arc-furnace using an electrical arc, comprising the steps of feeding a high current, from a high current power supply, using a large current conductor and an electrode, to the electrical arc, between the electrode and the melting metal of the arc-furnace and maintaining a plasma link between the electrode and the melting metal for a duration of an extinction of the electrical arc until a voltage of the high current power supply regains a value that will reestablish the electrical arc.

BRIEF DESCRIPTION OF THE DRAWINGS

The invention will be better understood by way of the following description of specific preferred embodiments, together with the accompanying drawings, in which:

FIG. 1 shows a single line diagram of a basic AC arc-furnace as known in the art;

FIG. 2 shows is a typical construction of a three-phase AC arc-furnace as known in the art;

FIG. 3a and FIG. 3b show the evolution of the arc in the furnace according to the variation of the voltage and the current; in FIG. 3a, the arc intensity changes as the current decreases to 0; in FIG. 3b, which shows the preferred embodiment of the present invention, an HF current supply is injected in the plasma;

FIG. 7a and FIG. 7b show an apparatus using a cooled coaxial cable which allows the HF source to be installed at a remote location; in FIG. 7a, the HF power supply is a current source; in FIG. 7b, the HF power supply is a voltage source;

FIG. 8 shows a cross section of the coaxial cable used to install the HF source at a remote location; a support member is surrounded by a first conductor layer; a second conductor layer surrounds the first conductor layer and is separated from the first layer by a dielectric layer;

FIGS. 9a and 9b shows another configuration where the HF source is located at a remote location and where a snubber circuit is used to cut off harmonic components; in FIG. 9a, the HF source is a current source; in FIG. 9b, the HF source is a voltage source;

FIG. 10a comprises a voltage generator, an HF voltage inverter and an optional HF voltage transformer; FIG. 10b comprises a current generator, an HF current inverter, and an optional HF current transformer;

FIGS. 10c and 10d show in more detail an HF inverter circuitry, comprising an HF sense circuit, a controller unit, gate drivers and an H-Bridge; in FIG. 10c, the HF sense unit senses a current and the input of the circuit is a DC voltage; in FIG. 10d, the HF sense unit senses a voltage and the input of the circuit is a DC current;

FIG. 11a shows the HF voltage produced by an inverter; FIG. 11b shows the electrode voltage; and FIG. 11c shows the current in the furnace arc;

FIG. 14 shows the installation of all the components of the apparatus of one embodiment of the present invention in a three-phase arc-furnace.

DETAILED DESCRIPTION OF THE PREFERRED EMBODIMENT

Figure 4:
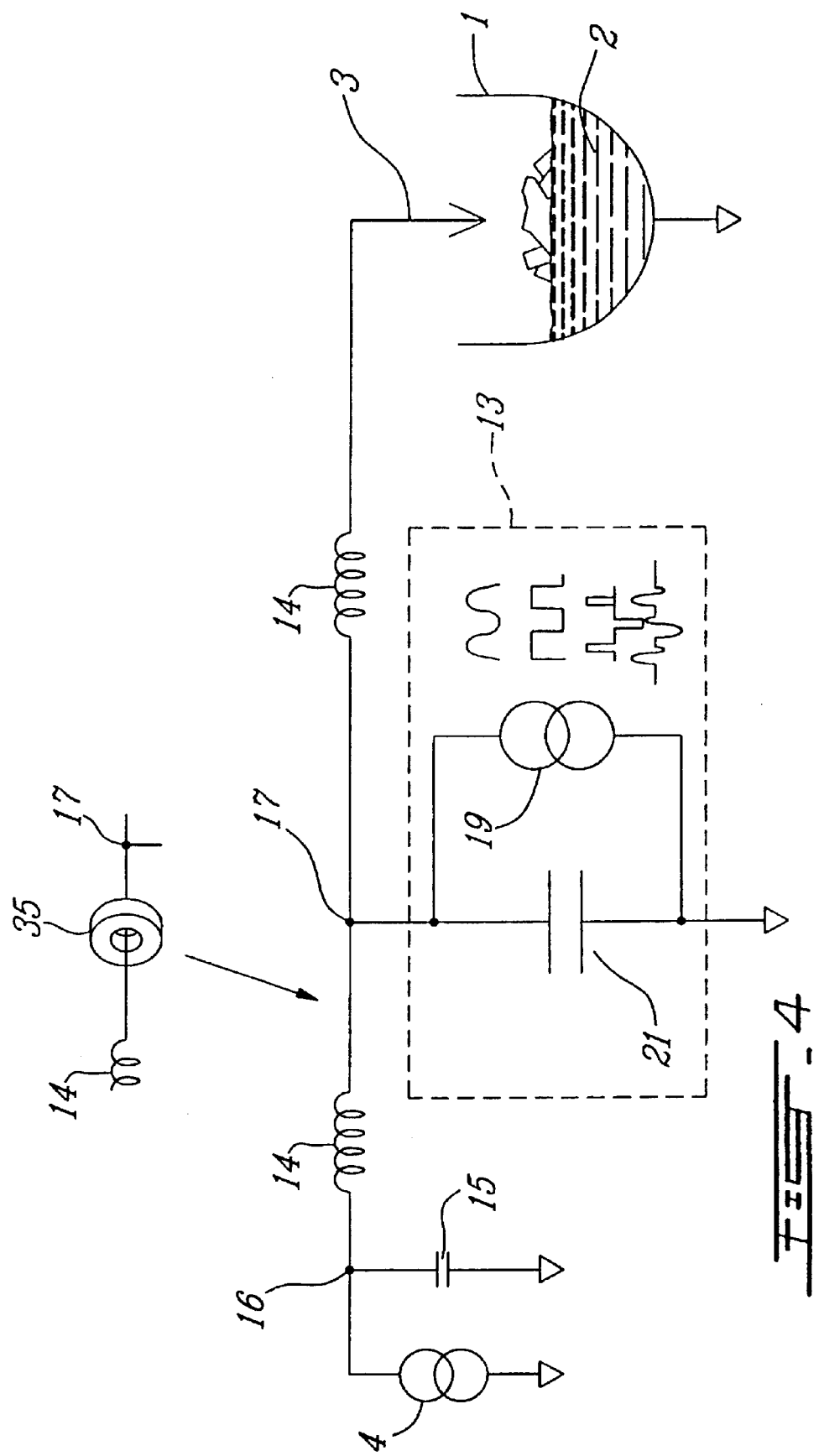
FIG. 4 shows a schematic circuit diagram of an apparatus to inject an HF electrical energy in the plasma column at the electrode end in order to re-strike an arc; the circuit comprises a high current power supply, a capacitor, an inductor, an HF current source with a capacitor.

Referring now to FIG. 1, there is shown a schematic of an AC arc-furnace. It comprises a vat 1 for holding the element 2 to be melted. An electrode 3 is clamped to a conductive and mobile supporting member 12 with the aid of a clamp-release contact 5. An actuator 10 is fixed under the supporting member 12 to provide a vertical mobility to the electrode. A large current power supply 4 is connected to the conductive supporting member 12 with a flexible and high current conductor 6 to allow the movement of the supporting member 12. The large current power supply 4 comprises a step down transformer 8 connected via a voltage tap changer 9 to the utility network 7. In operation, electrode 3 is lowered in the vat 1 by the actuator 10 to strike an arc with the metal 2. Then, the actuator 10 acts on the arc length by positioning the height of the electrode and the voltage tap changer 9 is switched to control the mean current supplied to the arc. The arc current follows a return path through a bottom electrode in the vat 1 or through another arc produced between the metal 2 and another electrode. As the arc burns, the electrode is consumed and, when it becomes necessary, a new electrode 3 is attached to the upper end and slid to ensure a continuous feeding.

In an other type of arc-furnace apparatus, the large current power supply 4 includes a rectifier which is inserted at the output of the transformer to convert the AC current into a DC current, therefore to generate a DC plasma current at the electrode end.

Referring now to FIG. 2, there is shown a typical construction of a three-phase AC arc-furnace. Except for the network supply, every part of the schematic draft of FIG. 1 is identified by like reference numerals.

According to the present invention, the object of the method and apparatus is to maintain a plasma link between the electrode end and the melting metal during the current-less time intervals. The plasma link is conditioned by a quasi-continuous energy power supply that generates new ions and new free electrons within the plasma. The quasi-continuous energy power supply supplies energy to the plasma in a way that may be continuous, or if not, may be oscillatory or in the form of repetitive pulses at a frequency faster than the vanishing time constant of the plasma. With the method and apparatus of the present invention, the current-less time intervals occurring in the furnaces of the prior art will be reduced by lowering the ignition-voltage necessary to the large current power supply to strike the main furnace arc. The arc furnace will be able to operate in conditions where the arcs will be more stable than without the use of this invention.

According to the present invention, one embodiment of the method and apparatus is to maintain a plasma link of a length greater than the maximum length of the main furnace arc. This way, a plasma link will be maintained in some encountered conditions where the furnace supply voltage cannot exceed the ignition-voltage. These conditions include the stretch of the plasma link caused by the movement of the arc in the furnace vat or by the movement of the arc itself, which may both cause the interruption of the main furnace arc. Then, with the motion of the electrodes or with the erratic movement of the plasma itself, the plasma link will get shorter enough for the voltage of the high current power supply to exceed the ignition voltage and strike the main furnace arc. This will reduce the number of events involving the complete loss of the main furnace arc.

The energy supply source can be an apparatus such as, for example, a laser beaming through a hole in the center of the electrode (e.g. an axial borehole) or, in the preferred embodiment of the present invention, it can be an electrical power supply providing a current to the plasma. The electrical power supply operates by injecting a quasi-continuous electrical energy, more particularly by injecting an HF (High Frequency) AC oscillating electrical energy at a frequency faster than the time constant of the plasma to vanish.

It is another object of one embodiment of the present invention to inject an HF AC oscillating electrical energy in the plasma at the electrode end to facilitate restriking in an arc-furnace.

Also according to the present invention, another object of the method is to create an HF electrical energy discharge at the electrode end with an HF voltage when the plasma link has been lost after an arc interruption. This HF electrical energy discharge will initiate a new plasma link with a reduced ignition-voltage for the main furnace arc to strike. The method will avoid having to make a contact between the electrode and the metal in order to strike an arc, which cause an inrush in the furnace high current power supply.

It is another object of one embodiment of the present invention to create an HF current discharge at the electrode end to facilitate the restriking in arc-furnace.

In an arc-furnace, the typical carrying conductors used to carry the current from the transformer up to the electrodes are constructed using copper in the form of a long conduit having a wall thickness close to the line frequency skin depth. The conduit is required to cool the conductor by forcing circulation of water through its opening. An arc-furnace design uses large diameter conduit easily exceeding 30 cm. At higher frequencies, the skin depth becomes very thin. A current at this frequency range, flowing in the conductor, will be concentrated in the outer periphery of the conductor. The large diameter of the arc-furnace conductors offers a long periphery for the HF current to distribute itself around. It results in a very low resistance for the conductor. Also, the arc-furnace conductors may run for at least a dozen meters from the transformer output up to the electrodes. The resulting parasitic inductance of the conductor combined with its low resistance forms an inductor typically ranging from 10 pH to 30 $\mu$H and having a good quality factor around the 100 kHz range. According to the present invention, a resonant capacitor is connected to the supply of the of the arc-furnace close to the electrode side. Therefore, this capacitor in conjunction with a major section of this inductor can be forced in to resonance within a certain frequency range.

According to the present invention, the HF oscillating electrical energy can be injected in the plasma at the electrode end using the resonant circuit and an HF power source. An HF current is injected in the plasma when the HF current source oscillating near or at the resonant frequency feeds the electrode besides the resonant capacitor. Then, the resonant circuit at the output goes into resonance and builds up an oscillating voltage at the electrode in accordance with the plasma conductivity to generate an HF current flow through the plasma column. The HF current will follow a path in the plasma column to maintain a plasma link. The voltage buildup at the electrode can be higher than the arc-furnace supplied voltage so that it is possible to maintain a longer plasma link.

To better illustrate the impact of the present invention on the arc-furnace, FIG. 3 shows the evolution of the furnace arc voltage and current accompanied by a series of drawings of the electrode arc. In FIG. 3a, the arc intensity changes as the current decreases to zero. At zero current, the instant reapplied voltage is lower than the ignition-voltage and introduces a delay until the voltage source catches up the ignition voltage and the main furnace arc is restriken. In FIG. 3b, the apparatus of the present invention injects an HF current in the plasma which can be viewed on the arc current waveform. In the Figure, the frequency of the HF current has been intentionally reduced for purpose of clarity. The drawing of the arc at the electrode shows an HF arc at the zero current point which reduces the ignition-voltage and allows the main furnace arc to strike sooner. The impact results in a higher current under area thus increasing the amount of power injected in the furnace vat.

Also according to the present invention, an HF electrical energy discharge can be produced at the electrode end if there is not enough plasma for the HF current to flow through. The resonant circuit still goes into resonance and builds up an oscillating voltage at the electrode. This oscillating voltage can be made high enough to initiate a dielectric breakdown and generate an HF current discharge.

Referring now to FIG. 4, there is shown a schematic diagram of an HF resonant circuit integrated with an arc-furnace according to the present invention. It comprises: a capacitive circuit 13 which comprises a resonant capacitor 21 connected to the arc-furnace large current conductor at a junction point 17 close to the electrode and an HF controlled current source 19 which is also connected close to the electrode and in parallel to the capacitor 21. The arc-furnace also comprises an HF bypass impedance preferably composed of a capacitor 15 connected to a supply path at the junction point 16 on the same conductor and close to the arc-furnace current supply output 4. As previously mentioned, the conductive section located between the end connections 16 and 17 has a parasitic self-inductance 14 referred to as the resonant inductor. The inductor 14 and the capacitor 21 create with the bypass capacitor 15, a resonant circuit having a resonant frequency of:

$$f_r = 1/2\pi\sqrt{LC}$$

where L and C are respectively the inductor 14 inductance and capacitor 21 capacitance values. Considering that the size of the capacitor 21 is growing with its $\mu F$ value, it is possible to reduce this value by inserting a ferromagnetic material 35 around the arc current carrying conductor that will increase the inductance value 14. This ferromagnetic part is designed to saturate slightly above the maximum resonant current. Typically, the resonant current will be of a few hundreds of amperes compared to a few tens of thousands of amperes for the furnace supply current. Thus, the ferromagnetic part will not interfere with the furnace supply path impedance as it saturates rapidly as the main furnace arc current ignites.

According to the present invention, the apparatus is characterized in that the inductor element of the resonant circuit is constituted mainly by the parasitic self-inductance of the conductor intended to carry the plasma current to the electrode end. This avoids having to use external inductors that are difficult to insert due to the large geometry of the arc-furnace conductors.

The injected HF current in the plasma can be increased in the present invention if the resonant capacitor and the HF power supply are connected at a distance from both the bypass impedance 15 and the electrode 3. Inductor 14 is now split in two (shown in FIG. 4), each part belonging to a distinct loop, both loops sharing the capacitor 21 as a common branch. When the main furnace arc is burning, the two inductor 14 parts appear in parallel to the high frequency components. Then, if the HF power supply is tuned to the resonant frequency, of this oscillatory circuit, a part of the resonant current with increased amplitude will flow through the plasma.

The resonant frequency must be faster than the time constant for the plasma to disappear. In a preferred embodiment of the present invention, the resonant frequency is located in the tens of kilohertz frequency range, close to 100 kHz. Typically, the resonant inductor value lies between 10 $\mu PH$ to 20 $\mu H$. Therefore, the resonant capacitor has a value in the hundreds of nF range. The resonance is created by operating the HF source 19 at a frequency near the resonant frequency. The resonant voltage at the electrode can increase as high as 5 kV to 10 kV, and is much higher than the maximum output voltage of the furnace power supply, which is about 1 kV. This difference in voltage allows the apparatus to maintain a longer plasma link compared to the plasma column length that the furnace power supply can maintain. The current source 19 may be sinusoidal; trapezoidal; pulsed or quasi-resonant pulsed type. In all cases, it is necessary that the fundamental component frequency of the HF current source 19 oscillates close to or at the resonant frequency. Preferably, the HF current source peak power output is about 100 kW with a RMS supply current between 10A to 100A.

When the arc-furnace has more than one phase (most arc-furnaces work with three phase arc currents), the HF current sources may work asynchronously or synchronously with a predetermined phase shift. Preferably, they work synchronously in phase with their output oscillating voltage.

In operation, the resonant circuit can inject an HF current in the plasma from ten to a few hundreds of amperes, and can produce an arc power of several tens of kilowatts.

In FIG. 4, the HF bypass capacitor 15 acts as a short circuit at the resonant frequency range to bypass the furnace current supply 4 in order for the resonant circuit to operate adequately. It is also used to avoid the propagation of the resonant current and voltage into the power supply of the arc-furnace (typically the transformer inner winding). The bypass capacitor 15 can also be connected to the transformer conductive enclosure to prevent excessive voltage from appearing across the insulation between the transformer windings and the enclosure. Generally, arc-furnace transformers are not designed to meet dielectric specifications for recurrent application of an HF voltage in the inner parts of their coils. Introduction of a voltage or current at a high frequency may result in rapid deterioration of the dielectric material and consequently will lead to a shorter lifetime. Considering the large price of this equipment, proper protection is important. The HF bypass capacitor 15 must be large enough to limit the perturbation of the resonant current and voltage to within a maximum value. Preferably the voltage is limited to a few tens of volts and the bypass capacitor has about ten to a hundred of $\mu F$.

Figure 5:
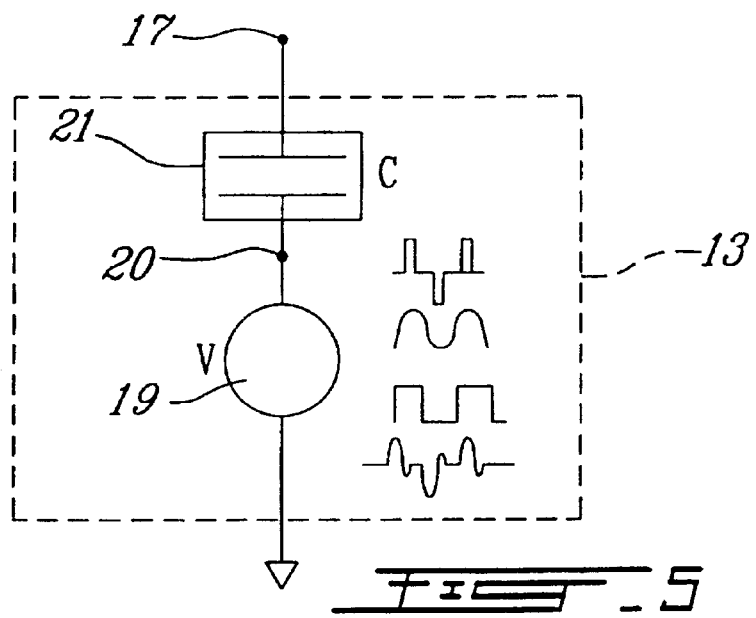
FIG. 5 shows an HF voltage source with its capacitor.

FIG. 5 shows another configuration of the capacitive circuit 13 according to the present invention for injecting a high frequency current at the electrode. Instead of connecting a current source in parallel with the capacitor 21, the same effect can be obtained by inserting an HF voltage source in series with the capacitor 21. The voltage source 19 may be, as explained above, sinusoidal, trapezoidal, pulsed or quasi-resonant pulsed type at the frequency near or equal to the resonant frequency.

The capacitive circuit 13 in FIG. 4 has an advantage over the capacitive circuit of FIG. 5 if the HF supply 19 generates harmonics. The capacitive circuit of FIG. 4 will generate less EMI interference since the harmonics are restrained within the HF current supply and the resonant capacitor 21. In counter part, the voltage harmonics of the HF voltage source 19 of FIG. 5 will propagate to the inductor 14 and will generate EMI interference through the leaking magnetic field. The circuit of FIG. 4 is the preferred embodiment of the present disclosed apparatus.

Referring back to FIG. 4, the arc-furnace plasma current supply may be either DC or AC at the line frequency of the utility network. The apparatus of the present invention must take into account the presence of the plasma current supply frequency. During operation of the furnace, the resonant capacitor 21 will withstand the sum of the HF voltage and the arc-furnace supplied voltage. The LF (low frequency) voltage component will add stress on the capacitor that must be accounted in the capacitor design. The design criteria been different for an LF and an HF capacitor, it is cost effective to separate both frequency components.

Figure 6:
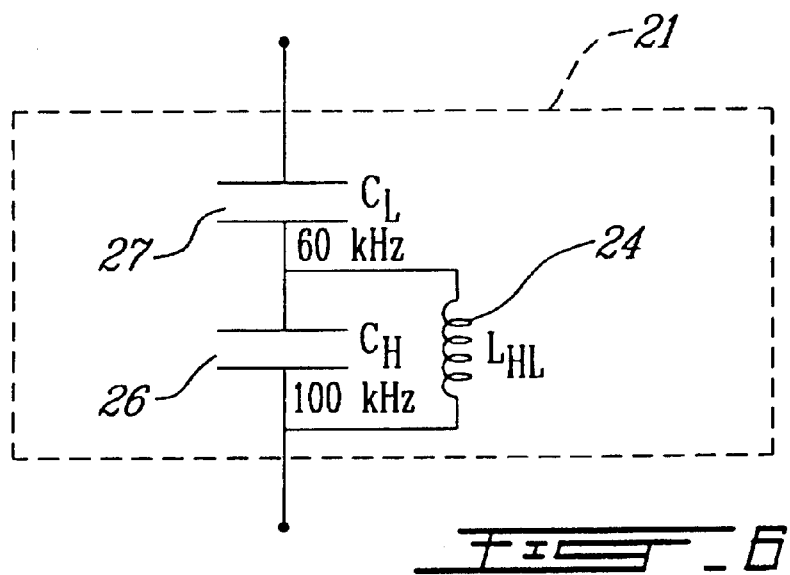
FIG. 6 shows a resonant capacitive circuit that separates the line frequency voltage from the HF voltage; the resonant capacitive circuit comprises a bypass inductor and two different capacitors.

Referring now to FIG. 6, there is illustrated a different way to provide the capacitor 21 of FIG. 6 in order to reduce the voltage stress on the HF capacitor and the associated costs. The capacitor 21 of FIG. 6 contains elements to separate the line frequency voltage (or DC) from the resonant frequency voltage. The capacitor 21 comprises: an HF capacitor 26; an LF bypass inductor 24 connected in parallel to the HF capacitor 26; and an LF blocking capacitor 27 connected in series with the HF capacitor 26 and the inductor 24. The HF range includes the resonant frequency. The characteristics of both the inductor 24 and the capacitor 27 force the HF voltage to appear mainly across the capacitor 26 and the LF voltage to appear mainly across the capacitor 27.

An important factor to consider for the present apparatus is the operating environment conditions. Any device that must be located on the supporting member 12 of the arc-furnace will be exposed to intense heat and open flames, will encounter frequent vibrations, will be splashed by metal in fusion, and will be submitted to the magnetic field produced by tens of thousands of amperes that flows in the nearby furnace conductors. The capacitor 21 must be placed in close proximity to the furnace vat for the apparatus to operate adequately. The capacitor 21 is a dense and passive component that can be easily packaged into a water-cooled housing for protection. So, its operation does not cause a major problem and needs no maintenance. In case of a defect, its replacement can be made easily on the next scheduled shutdown. On the other hand, the HF source is composed of semiconductor elements, of electronic and digital elements and needs initial tuning. The harsh environment conditions represent a serious challenge for the HF source that, once rugged, will be costly to manufacture. Also, the tuning, probing and debugging represents a problem. A person is not allowed to access the arc-furnace when it is operating. An unplanned shutdown is extremely costly to the furnace owner so that in case of a failure in the HF source, the apparatus will remain inoperative until the next planned shutdown.

According to the present invention, the HF power source can be located in an area not exposed to the harsh environment of the arc-furnace. The HF source uses an HF supply cable 50 to connect the HF supply to the circuit far enough from the vat. The choice of location will be made to guaranty an access without interrupting the operation of the furnace. This represents a major advantage.

FIG. 7a shows a schematic illustrating the circuit of FIG. 4. The difference is that the HF current source 19 is connected to the node point 17 and in parallel to the capacitor 21 from a distant location via an HF supply cable 50. FIG. 7b applies the same technique, as FIG. 7a, for the HF voltage source of FIG. 5. The cable connects, in series, the capacitor 21 and the voltage source 19 via the nodal point 20. In both configurations, shown in FIGS. 7a and 7b, the cable 50 is preferably coaxial and is dedicated to carry the supply current or voltage over a distance far enough from the arc-furnace vat.

FIG. 8 shows the preferred embodiment for the cable construction of the present invention. It comprises a center support member 54 surrounded by a first conductor layer 55. The support member 54 has an external diameter sufficiently large to ensure enough conducting perimeter for the conductor layer 55 to carry the HF current of the HF supply source with reduced Joule losses. The support member 54 may be of any type of flexible material. In a preferred embodiment, the support member 54 is made of polytetrafluoroethylene or polyethylene and comprises at least one opening to allow a cooling liquid to flow through, in one or two direction. In FIG. 8, there is shown 4 different openings 60, 61, 62, 63; in the openings 60, 61, 63 the cooling liquid flows in one direction; in the opening 62, the cooling liquid flows in another direction. The cooling liquid, preferably water, can be used to cool down the cable, the resonant capacitor 21, or other parts requiring cooling. The conductor layer 55 is preferably made with a copper braid to ensure flexibility and have a braid thickness greater than the skin depth of the HF supply source frequency to ensure a maximum current distribution within the conductor section. A second conductor layer 57, of similar construction to the first conductor layer 55, surrounds the conductor layer 55 and is separated by a dielectric layer 56 of sufficient thickness to sustain the voltage. The dielectric layer 56 is preferably a low loss dielectric material such as polytetrafluoroethylene or polyethylene and is flexible. A heat-shield and insulated flexible jacket 58 covers the cable and ensures its protection against its environment.

In a typical arc-furnace installation, a cable of 25 to 50 meters is long enough to safely locate the HF power supply. The HF source supply frequency of the present invention (close to a hundred kilohertz) has a wavelength, in the cable, of a few kilometers, which is much greater then the cable length itself. Therefore, the cable shunt and series impedance can be considered as lumped elements at this frequency. In the circuit configuration of FIG. 7a, the cable parasitic capacitance dominates over the inductance and must be added to the value of the capacitor 21. Conversely, in the circuit of FIG. 7b, the cable parasitic inductance dominates and must also be added to the inductor 14 inductance value of the furnace conductors. In both cases, the cable contribution to the circuit impedance remains low and does not seriously affect the resonant current and voltage frequency in the L/C circuit.

Figure 10A:
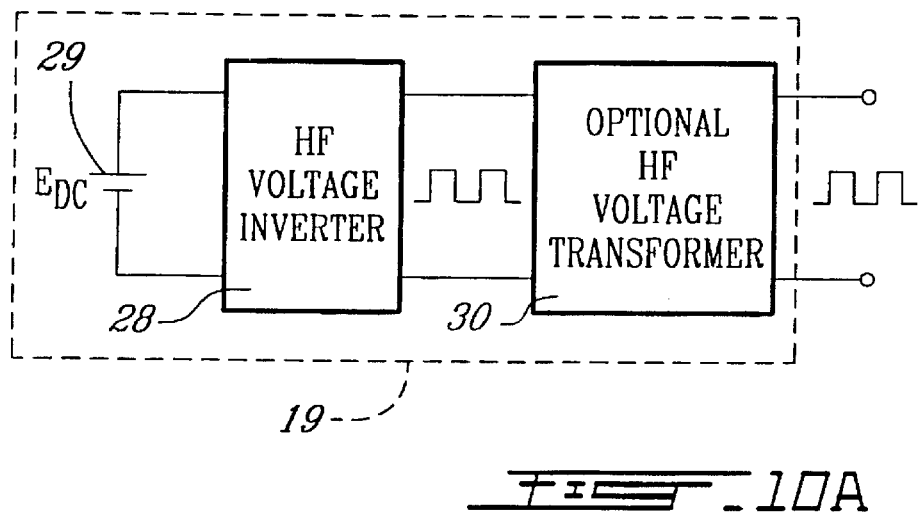
FIGS. 10a and 10b shows in more detail the circuitry for the HF voltage and current sources respectively.
Figure 10B:
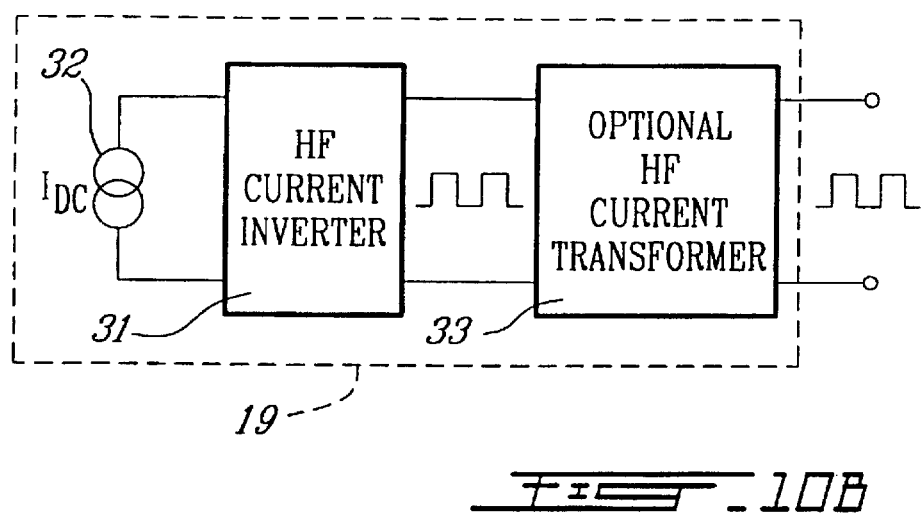

The circuits of FIGS. 9 are a modified version of the circuit shown in FIG. 7 and are used when the HF power supply produces harmonics like the HF power supplies of FIG. 10. Referring now to FIG. 9a, the HF current source 19 is connected to the arc-furnace conductor 17 via the HF coaxial cable 50 and a snubber circuit 59. Referring to FIG. 9b, the HF voltage source 19 is remotely connected, in series with the resonant capacitor 21 at the connecting point 20 which is connected in parallel to a snubber circuit 59 via the HF coaxial cable 50. In both configurations, when the harmonic wavelength is of the same order as the cable length, the coaxial cable 50 acts as a transmission line having a propagation time for the wave to reach the other end of the cable. Depending on the cable ends' impedance, a reflection can be created successively at both ends. This "back and forth" wave from one end to the other creates an undesired oscillation. The snubber circuit 59 is intended to attenuate these reflections.

From the HF source side of the cable, the transient impedance seen by the source prior to the return of any reflection is called the surge impedance and is equal to:

$$\text{Surge impedance} = \sqrt{L_c/C_c}$$

Where $L_c$ is the cable's inductance per unit length and $C_c$ is the cable's capacitance per unit length. An injected current transient into the cable will generate a surge voltage proportional to the current amplitude times the surge impedance during the period preceding the return of the first reflection. If a voltage wave is injected instead, a current surge will be generated in proportion to the voltage amplitude divided by the surge impedance.

Referring back to FIG. 9a, the snubber circuit 59 comprises a resistor 51 connected in series with an HF coupling capacitor 52, and it also comprises an LF (Low Frequency) bypass inductor 53 connected in parallel to the resistor 51 and the HF coupling capacitor 52. The inductor 53 and the capacitor 52 values are chosen so that the snubber circuit 59 almost acts as a short-circuit for LF components (including the resonant frequency) and appears as only resistor 51 for frequencies higher than the resonant frequency. In operation, the harmonic waves coming from the HF supply source encounter the snubber circuit 59 as a terminal impedance since the capacitor 21 behaves as an short-circuit. These harmonic waves have a frequency content higher than the resonant frequency and will therefore see resistor 51. By matching the resistor 51 to the cable surge impedance, the reflections will be strongly attenuated. Dues to inductor 53, the current oscillating at the resonant frequency sees the snubber circuit as a short-circuit thus avoiding the creation of unnecessary Joule losses in the snubber circuit.

The snubber circuit of FIG. 9b is different from the snubber circuit of FIG. 9a since the HF voltage source is connected in series with the resonant capacitor 21. The snubber circuit 59 comprises a resistor 51 connected in series to an HF coupling capacitor 52 and an LF bypass inductor 53 connected in parallel to the resistor 51. The inductor 53 and the capacitor 52 are chosen so that the impedance of the snubber circuit is close to an open-circuit for LF components (including the resonant frequency) and appears as only the resistor 51 for frequencies higher than the resonant frequency. In operation, the harmonic waves incoming from the HF voltage source encounter the snubber circuit 59 as a terminal impedance. These harmonic waves have a frequency content higher than the resonant frequency and will therefore see the resistor 51 equaled to the surge impedance and the reflections will be strongly attenuated. The inductor 53 serves to bypass the resistor 51 for lower frequencies in order to avoid unnecessary Joule losses.

The preferred embodiment uses the circuit configuration of FIG. 9a. The coaxial cable has a parasitic inductance below 0.05 µH/m, a parasitic capacitance below 500 µF/m and a surge impedance bellow 20Ω. With this surge impedance, the surge voltage produced by the injection of a high current harmonic content is moderate and avoids excessive stresses on the HF current supply.

In a preferred embodiment, the HF coaxial cable 50 can be installed along the arc-furnace conductor 6 and 12 without perturbing the arc-furnace conductors movement. Also, the HF cable can be inserted into a flexible metal pipe running along the arc-furnace conductor in the region close to the vat in order to protect the HF cable from the furnace open flames and from the splashes of metal in fusion.

For the following description that relates to FIGS. 10 and 11, whenever the term is followed by a term in parenthesis, the term applies to the series voltage source of FIG. 5 and the term in parenthesis applies to the parallel current source of FIG. 4. If it applies only for one case, it will be specified.

Referring now to FIGS. 10a (10b), there is shown the preferred embodiments of the HF voltage (current) source in accordance to the present invention.

In FIGS. 10a (10b) the HF voltage (current) source 19 constructed using an HF voltage (current) power inverter 28 (31) supplied by a DC voltage (current) source 29 (32). The inverter uses technology commonly found in the known art and incorporates a controller and sensors to adjust the frequency according to sensed conditions. Preferably, an HF voltage (current) transformer circuit 30 (33) is inserted at the output of the HF voltage (current) inverter in order to adapt the voltage and the current to fully use the power handling capability of the semiconductor switches in the inverter. The HF transformer 30 (33) comprises a magnetic coupling transformer and may include decoupling elements to avoid propagation of the furnace supply current into the HF source. Also, if the resonant capacitor circuit of FIG. 6 is used in combination with the HF current source, the current transformer 33 magnetizing impedance may be sized in such a way that it replaces the inductor 24 thus reducing the number of components.

Referring now to FIGS. 10c (10d), a more detailed schematic representing a preferred embodiments of the HF voltage (current) sources are shown. The HF voltage (current) inverter 28 (31) includes an H-bridge inverter 39 which includes semiconductor elements such as IGBTs and diodes. The gate-controlled semiconductors are activated by gate drivers 40 and the switching commands are sent to the gate drivers by a controller unit 41. The switching commands are determined by the controller unit 41 in relation to the resonant frequency. It can be a fixed frequency or a frequency locked to the HF waveform produced by an HF current (voltage) sense 42 connected to the resonant circuit. In a preferred embodiment shown in FIGS. 10c (10d), the HF sensor reads the current 43 (voltage 44) at the output of the inverter 39. If the apparatus of the present invention comprises the optional HF voltage (current) transformer 30 (33), it is preferred to connect the HF sensor at the output of the transformer in order to avoid possible interaction between the internal impedance of the transformer and the resonant circuit operation and controllability.

The HF voltage (current) source can operate appropriately with the resonant circuit when the HF sense unit is connected elsewhere in the circuit. For example, it could be connected across the capacitor 21. It is important for the controller to monitor an HF waveform produced by the resonant circuit when excited by the HF voltage (current) source, in order to command the phase difference between the HF voltage (current) source and the sensed current or voltage. In this way, in one embodiment, it is possible to synchronize the commutation of the inverter with a zero-crossing event of the current (voltage) to reduce the switching losses in the semi-conductors.

According to one particular embodiment of the present invention, when the output of the HF voltage (current) inverter 28 (31) is connected to an HF resonant circuit, the method to control the HF voltage (current) source comprises the steps of: reading and sending to the controller unit 41 the HF sensed current (voltage) waveform resulting from the interaction of the HF voltage (current) source 28 (31) with the resonant circuit it is connected to; performing with the controller unit 41 a phase locking to the HF sensed signal waveform and generating with the controller 41 the switching command cycles for the gate drivers at a predetermined phase shift from the read waveform signal in order to impose an HF voltage (current) at the output at a determined phase-shift from the output current (voltage).

According to another embodiment of the present invention, when the output of the HF voltage (current) inverter 28 (31) is connected to an HF resonant circuit, the method to control the HF voltage (current) source comprises the steps of: reading and sending to the controller unit 41 the HF sensed current (voltage) waveform resulting from the interaction of the HF voltage (current) 28 (31) with the resonant circuit it is connected to; comparing said HF sensed current (voltage) with a current (voltage) threshold; if the sensed current (voltage) is lower than the current (voltage) threshold, then generating with the controller 41 the switching command cycles in order to produce an HF voltage (current) at a standby frequency close to the resonant frequency; if the sensed current (voltage) is higher than the current (voltage) threshold, then performing with the controller 41 a phase-lock to the HF sensed signal waveform, and generating with the controller 41 the switching command cycles for the gate-drivers, at a predetermined phase-shift from the read waveform signal, in order to impose an HF voltage (current) at the output at a determined phase-shift from the output current (voltage).

In the present invention, the HF voltage (current) source 28 (31) is operated in such a way to track the resonant frequency of the resonant circuit. This action is performed by the controller unit 41 and is achieved by forcing a phase-shift between the HF inverted voltage (current) and the sensed waveform that results in a null difference in phase between the inverted HF voltage (current) and the resulting HF output current (voltage).

This condition is obtained when the HF voltage (current) source is switching at the resonant frequency of the HF resonant circuit.

The inductance of the furnace conductor is changing when the electrodes are in movement. Of course, this affects the resonant frequency that the controller of the inverter will track.

When the inverter operates at the standby frequency, the standby frequency is chosen at a convenient value in the range of all possible resonance frequencies. The variation of the inductance of the furnace conductors varies with the logarithm of the distance separating the conductors, and the resonant frequency varies with the square root of the conductors' inductance. When the arc-furnace operates, the electrodes relative displacement is normally maintained small enough to avoid any unbalance in the conductors' impedance that would create an unbalance in the currents. Therefore, the resonant frequency is not expected to change much on an arc-furnace installation and the standby frequency will be close enough to the resonant frequency to build a resonance. When the oscillating current (voltage) reaches the threshold, in one embodiment of the present invention, it is preferred to lock the inverter frequency at the resonant frequency in order to reduce the switching loss in the inverter and achieve the highest resonance. In an other embodiment, the last frequency locked can be held by the controller and used as the standby frequency until the next threshold is attained. This has the advantage that, until the next zero current point of the next half cycle, the furnace conductor configuration will not move in a perceptible way to affect the resonant frequency.

Figures 11A, 11B, 11C:
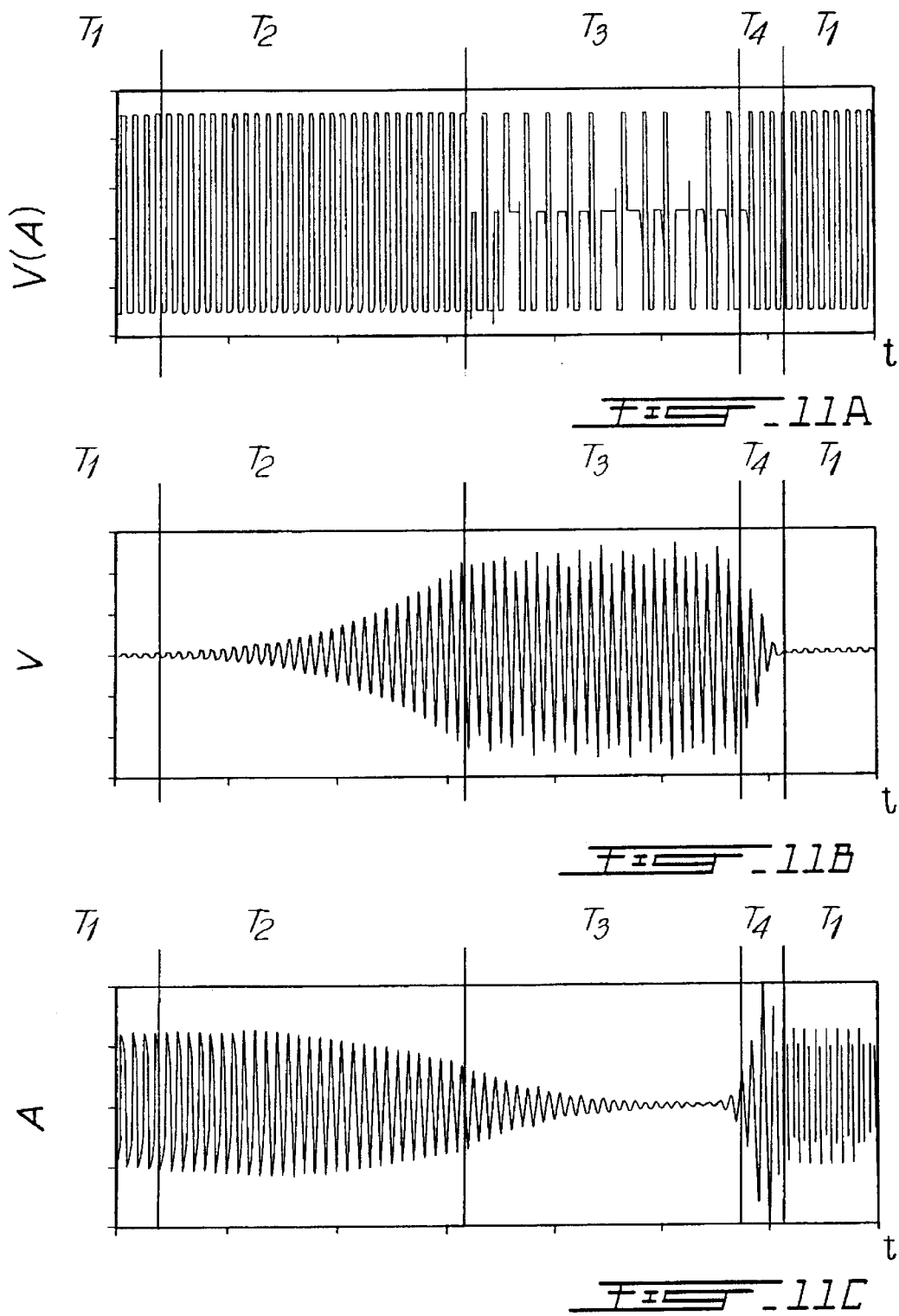
FIGS. 11a, 11b and 11c show voltage or current plots which illustrate the operating principle of the present invention.

FIG. 11 is composed of three plots whose time scales are divided according to the four time periods involved in the restriking process. The first plot FIG. 11a illustrates the evolution of the square wave HF voltage (current) source produced by an inverter such as the one described in FIG. 10. FIG. 11b shows the evolution of the resonant capacitor HF voltage. Of course FIG. 11c shows the evolution of the HF current in the furnace plasma. The component of the current and voltage created by the furnace power supply were intentionally omitted for clarity of the description.

Period TI corresponds to an arc burning condition in the arc-furnace operation. During that period, the plasma column carries the main furnace arc current and the HF arc current shown in FIG. 11c. The HF voltage at the resonant capacitor is considerably reduced in FIG. 11b due to the shunting effect provided by the high conductivity of the plasma column. This voltage is not tracked by the controller unit, which then operates at the standby frequency, not far from the resonant frequency. In a different embodiment, the HF current source can be also turned off during that period since the arc is burning.

The beginning of period T2 corresponds to an interruption of the furnace arc. The loss of the arc causes the plasma column to gradually lose its conductivity depending on the environment temperature and condition. As the conductivity decreases, the resonant circuit increases its resonance and builds an HF voltage on the resonant capacitor to maintain the HF arc current shown in FIG. 11c. Depending on decreasing rate of the plasma conductivity, energy will be supplied by the HF voltage (current) source to crank up the resonance. This will reduce the HF injected current in the plasma. During the intensification of the resonance, if the threshold current (voltage) is exceeded, the control unit triggers a phase lock loop circuit to lock the voltage (current) source frequency at the resonant frequency in order to limit the switching loss of the inverter. If the furnace arc re-ignites, the voltage drop will collapse and T4 start immediately without entering into T3.

The condition at the beginning of T2 may also correspond to an interruption of the arc as well as a loss of the plasma column. Another condition that would have caused a resonance could be the interruption of the arc followed by the loss of the plasma column. In this case, the HF would be null and the resonance will increase at the rate related to the amount of energy supplied by the HF voltage (current) power supply and limited by the dissipation factor of the resonant circuit. Of course, the plot of FIG. 11c would have shown no HF current in periods T2 and T3 until an ignition occurs.

To limit the voltage at the electrode, a further aspect of this embodiment of the present invention comprises a control strategy to limit the electrode resonant voltage by controlling the way the inverter is switched. At the beginning of period T3, if no ignition is obtained and the voltage reaches its maximum permissible value on the resonant capacitor, the inverter starts to cut out half cycles and lets the oscillating voltage decay. Once a lower limit value is reached, the inverter injects the number of half cycles necessary to bring the voltage back up to its upper limit, thus maintaining the oscillation in an apparent steady state and keeping the resonant voltage present at the electrode end. In this situation, the plasma conductivity may be gradually lost. In that case, the HF arc current will decrease and will eventually extinguish. But, the voltage will still be maintained and will help to strike a new main furnace arc when the arc-furnace electrode will be moved towards the scrap.

At the beginning of period T4, ignition occurs; the main furnace arc is re-established; the voltage collapses; the HF current flows in the arc; and the HF power supply inverter returns to the standby operating frequency before entering again into period T1.

Figure 12:
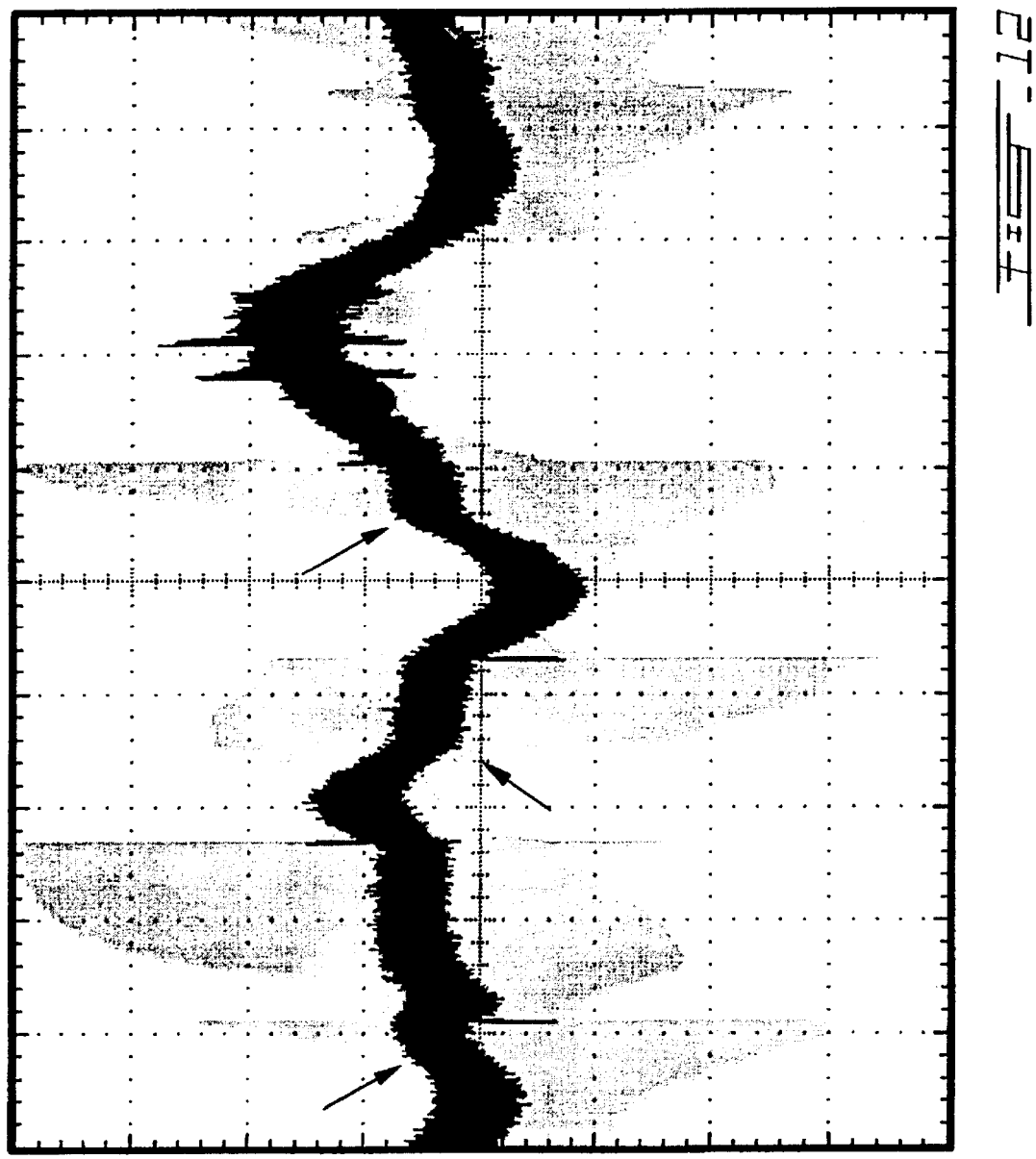
FIG. 12 shows the measured signal of the apparatus for one embodiment of the present invention; more precisely, the dark trace represents the current in the plasma column and the gray trace represents the voltage drop in the plasma column.

A demonstration is shown in the recorded signal of the present apparatus operating with a 60 Hz AC arc current in FIG. 12. The dark trace is the current in the plasma column and the gray trace is the voltage drop. The HF current in the plasma is superimposed on the 60 Hz current and is seen as a thick dark trace due to its very fast variation. The same also applies to the voltage drop. It can be observed that the HF resonant circuit combined with the HF power supply produces the necessary voltage to force the flow of HF current through the plasma column even if the plasma conductivity is changing. The persistence of the HF plasma current can be observed when the low frequency arc interrupts as pointed by the arrows. After the loss of the 60 Hz arc, the plasma starts to lose its conductivity and the resonant circuit of the present invention progressively increases the electrode voltage to inject the HF arc current in the plasma, thus maintaining the production of ions and free electrons. When the 60 Hz voltage catches up the reduced ignition-voltage, the low frequency arc ignites and the voltage collapses. The change in the dead time period is linked to the erratic behavior of the arc as mentioned earlier.

Figure 13:
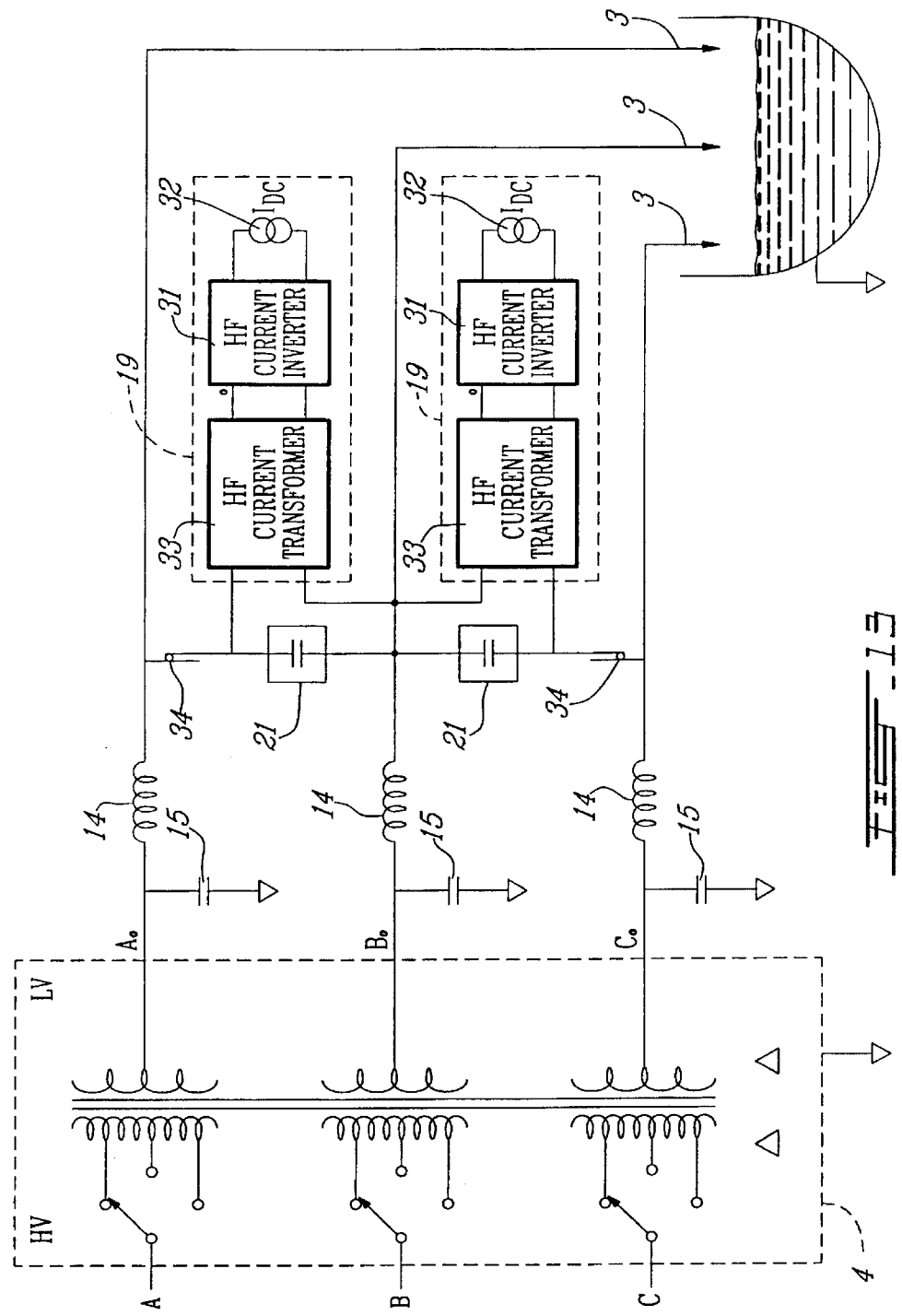
FIG. 13 shows the integration of one embodiment of the present invention into a three-phase arc-furnace; it comprises two HF current transformers, two HF current inverter and two current generator.

FIG. 13 shows a three-phase AC arc-furnace in accordance with the two embodiments previously described of the present invention. The arc-furnace uses two resonant capacitors 21 on a three-phase arc-furnace with two HF current sources 19 that may either work asynchronously or synchronously with a predetermined phase shift. This configuration has the advantage that it reduces the number of required components compared to using one resonant capacitor per phase. In this embodiment, the two HF current inverters 31 are operated at the same frequency and in opposite phase in reference to the dot mark at the inverter output 31. To maintain the resonant capacitor 21 in contact at the closest point from the electrode end, two sliding contacts 34 are added between each electrode's conductor and on one end of a resonant capacitor 21 on two phases to compensate for the movement of the electrodes. The other end of the two resonant capacitors 21 is permanently connected to the remaining electrode's conductor. The sliding contact normally covers a maximum displacement length. The displacement length can be sufficient to cover almost the entire gap encountered in operation between the two electrodes. In this way, the need is eliminated to make contact at very large gaps that occurs only a very few times during the arc-furnace operation without significantly affecting the advantages obtained and thus reducing the slide contact complexity.

Referring now to FIG. 14, there is illustrated a typical integration of the apparatus on the arc-furnace according to FIGS. 4 and 13. The resonant capacitors 21, are mounted on the central electrode supporting member. The HF current sources 19 are placed in a remote location as for instance, in the transformer room. The HF sources 19 are connected to their corresponding capacitor 21 via a pair of HF supply cable 50. In the preferred embodiment, the coaxial cables run alongside the central arc-furnace high current conductor. Each resonant capacitor 21 has one terminal connected to the central electrode supporting member and the other end connected to the corresponding lateral electrode supporting member via a sliding contact (not shown) to cope with the relative displacement of the electrodes. The high frequency bypass capacitor 15 is connected at the output of the supply transformer.

Another advantage of the apparatus of the present invention resides in the fact that little modifications are required to the arc-furnace equipment. The apparatus operates in parallel with the arc-furnace and can be switched off at any time and, in one embodiment of the present invention, the HF source may be in a failure mode and under repair without interrupting the arc-furnace operation.

The preferred embodiment of the apparatus of the present invention, the arc-furnace comprises a second electrical power supply to maintain or initiate a plasma link between an electrode and the melting metal after an interruption of the main furnace arc, with an apparatus located at a safe distance from the severe environment condition where the plasma is produced, using the inductive property of the furnace large current conductor, and where the apparatus is of modest size.

What is claimed is:

1. An apparatus to facilitate restriking of an electrical arc in an arc-furnace having a large geometry current conductor with a high-current power supply connected to one end of said large geometry current conductor and an electrode connected to the other end of said large geometry current conductor to produce said electrical arc for melting metal, the apparatus comprising a quasi-continuous electrical energy supply adapted to maintain a plasma link between the end of said electrode and said melting metal.

2. The apparatus as claimed in claim 1, wherein said quasi-continuous electrical energy supply is high frequency alternative current.

3. An apparatus as claimed in claim 2, wherein said high frequency alternative current energy supply Includes a resonant circuit utilizing a major section of an inductor formed by the self-inductance of said large geometry current conductor; and an high frequency power source operating near or at the resonant frequency of said resonant circuit and connected to said large geometry current conductor on the electrode side.

4. An apparatus as claimed in claim 3, wherein said high frequency alternative current electrical energy supply comprises a resonant capacitor connected to said large geometry current conductor on the electrode side, further wherein said resonant capacitor forms a resonant circuit with said self-inductance.

5. An apparatus as claimed in claim 4, further comprising an high frequency bypass-impedance connected in a supply path to said large geometry current conductor at a distance from said resonant capacitor.

6. An apparatus as claimed in claim 1, wherein said quasi-continuous electrical energy supply is of sufficient strength to initiate a plasma link between the end of said electrode and said melting metal.

7. An apparatus as claimed in claim 6, wherein said quasi-continuous electrical energy supply has a sufficient strength to maintain said plasma link of a length greater than the maximum length of said electrical arc.

8. An apparatus according to claim 2, wherein the frequency of said high frequency alternative current supply is located at about 100 kHz.

9. An apparatus according to claim 2, further comprising a ferromagnetic member surrounding said large geometry current conductor, wherein the ferromagnetic material exhibits a high permeability for magnetic field generated by the carrying-current below the maximum resonant current of said resonant circuit and going rapidly into saturation for carrying-current higher than said maximum resonant current and below the current of said electrical arc.

10. An apparatus according to claim 4, wherein said resonant capacitor comprises an high frequency capacitor; an low frequency blocking capacitor; and an low frequency bypass inductor to separate the high frequency voltage and the low frequency voltage.

11. An apparatus according to claim 5, wherein said high frequency bypass-impedance also bypasses the insulation between said high-current power supply and its conductive enclosure thereof.

12. An apparatus according to claim 5, wherein said high frequency bypass-impedance is essentially provided by a capacitor.

13. An apparatus according to claim 3, wherein said high frequency power source includes a controller capable of tracking said resonant frequency and adjusting the frequency of said high frequency power source.

14. An apparatus according to claim 13, wherein said controller cuts-out an integral number half cycles from said high frequency power source in order to limit the resonant voltage appearing at said electrode.

15. An apparatus according to claim 13, wherein said controller begins said tracking when an extinction of said electrical arc is detected.

16. An apparatus according to claim 13, wherein said tracking is performed all the time.

17. An apparatus according to claim 13, wherein said high frequency power source operates at a standby frequency when the resonant voltage or current of said resonant circuit is below a threshold.

18. An apparatus according to claim 3, further comprising a shielded high frequency supply cable, wherein said high frequency power source is located at a safe distance from the harsh environment of said arc-furnace and is connected to said large conductor beside said resonant capacitor via said high frequency supply cable.

19. An apparatus according to claim 18 wherein said high frequency supply cable comprises a coax.

20. An apparatus according to claim 19 wherein said coax comprises: a core supporting member, a first conductor layer surrounding said supporting member; a second conductor layer surrounding said first conductor layer and separated from said first conductor layer by a dielectric layer; and an outer protective jacket.

21. An apparatus according to claim 20, wherein said core supporting member incorporates at least one channel to allow a cooling fluid to flow there through.

22. An apparatus according to claim 18, wherein said high frequency supply cable comprises a snubber circuit at one end to attenuate the cable reflections.

23. An apparatus according to claim 22 wherein said snubber circuit comprises a resistor, an high frequency bypass capacitor and an low frequency bypass inductor.

24. An apparatus according to claim 1, comprising a sliding contact for delivering the quasi-continuous electrical energy of said quasi-continuous electrical energy supply.

25. The apparatus as claim 1, wherein said high-current power supply is an AC power supply.

26. A method for melting metal in an arc-furnace using an electrical arc, the method comprising the steps of:

feeding a high current, from a high-current power supply, using a large geometry current conductor and an electrode, to said electrical arc, between said electrode and said melting metal of said arc-furnace;

injecting quasi-continuous electrical energy at the end of said electrode;

maintaining a plasma link with said injected quasi-continuous electrical energy, between said electrode and said melting metal for a duration of an extinction of said electrical arc until the voltage of said high current power supply regains a value that will reestablish said electrical arc.

27. A method as claimed in claim 26 wherein said step of injecting quasi-continuous electrical energy at the end of said electrode is accomplished using a resonant circuit comprising a major section of the inductor formed with the self inductance of said large geometry current conductor, and an high frequency power source operating near or at the resonant frequency of said resonant circuit and connected to said large geometry current conductor on the electrode side.

28. A method as claimed in claim 26, wherein said plasma link has a length greater than a maximum length of said electrical arc.

29. A method as claimed in claim 26, further comprising the step of:

initiating a plasma link between said electrode and said melting metal without making a mechanical contact between said electrode and said melting metal.

30. A method as claimed in claim 26, further comprising the steps of:

positioning said electrode to increase the voltage of said electrical arc to provide higher power in said electrical arc, said electrical arc being less stable during operating conditions;

wherein said maintaining is carried out without altering the distance between said electrode and said melting metal.

* * * * *